United States Patent
Yamagishi et al.

(10) Patent No.: US 9,113,178 B2
(45) Date of Patent: Aug. 18, 2015

(54) STREAMING DISTRIBUTING DEVICE AND METHOD, STREAMING RECEIVING DEVICE AND METHOD, STREAMING SYSTEM, PROGRAM, AND RECORDING MEDIUM

(75) Inventors: Yasuaki Yamagishi, Kanagawa (JP); Naohisa Kitazato, Tokyo (JP); Yoshiharu Dewa, Tokyo (JP); Kazuhiko Takabayashi, Tokyo (JP); Mitsuhiro Hirabayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/554,421

(22) Filed: Jul. 20, 2012

(65) Prior Publication Data

US 2013/0185760 A1 Jul. 18, 2013

Related U.S. Application Data

(60) Provisional application No. 61/513,131, filed on Jul. 29, 2011.

(51) Int. Cl.
*H04N 7/16* (2011.01)
*H04N 7/08* (2006.01)
(Continued)

(52) U.S. Cl.
CPC ............ *H04N 21/235* (2013.01); *H04N 7/0885* (2013.01); *H04N 21/2355* (2013.01);
(Continued)

(58) Field of Classification Search
CPC ............ H04N 21/4884; H04N 9/8063; H04N 9/8233; H04N 21/235; H04N 21/23614; H04N 21/6125; H04N 21/85406; H04N 21/64322; H04N 21/8543; H04N 5/278; H04N 7/0885; H04N 9/8715

USPC .................................................. 725/137, 110
See application file for complete search history.

(56) References Cited

U.S. PATENT DOCUMENTS

2006/0233531 A1* 10/2006 Toyama et al. ................. 386/95
2006/0245727 A1* 11/2006 Nakano et al. ................. 386/95
2009/0055417 A1* 2/2009 Hannuksela .................. 707/100

FOREIGN PATENT DOCUMENTS

JP    2004-215203    7/2004
JP    2005-86362     3/2005
(Continued)

OTHER PUBLICATIONS

W3C (World Wide Web Consortium), "Timed Text Markup Language (TTML) 1.0", [online], Nov. 18, 2010, Internet <URL: http://www.w3.org/TR/2010/REC-ttaf1-dfxp-20101118/>.*

(Continued)

*Primary Examiner* — Ricky Chin
*Assistant Examiner* — Jen-Shi Huang
(74) *Attorney, Agent, or Firm* — Oblon, McClelland, Maier & Neustadt, L.L.P.

(57) ABSTRACT

Disclosed herein is a streaming distributing device including: a content fragment generating section configured to generate a fragment storing data of a content to be distributed by streaming, the fragment being defined by an MP4 file format; and a subtitle fragment generating section configured to generate a fragment storing a TTML (Timed Text Markup Language) document instance relating to a subtitle to be displayed in the content, the fragment being defined by the MP4 file format, wherein the subtitle fragment generating section adds, to header information of the fragment, instance classification distinguishing information for distinguishing whether the TTML document instance stored in the fragment is a TTML document instance specifying a rendering context relating to the subtitle.

13 Claims, 21 Drawing Sheets

(51) Int. Cl.
| | |
|---|---|
| *H04N 21/235* | (2011.01) |
| *H04N 21/236* | (2011.01) |
| *H04N 21/488* | (2011.01) |
| *H04N 21/61* | (2011.01) |
| *H04N 21/643* | (2011.01) |
| *H04N 21/854* | (2011.01) |
| *H04N 7/088* | (2006.01) |

(52) U.S. Cl.
CPC ..... *H04N21/23614* (2013.01); *H04N 21/4884* (2013.01); *H04N 21/6125* (2013.01); *H04N 21/64322* (2013.01); *H04N 21/85406* (2013.01)

(56) References Cited

FOREIGN PATENT DOCUMENTS

| JP | 2006-238147 | 9/2006 |
|---|---|---|
| JP | 2008-109691 | 5/2008 |
| JP | 2010-532605 | 10/2010 |

OTHER PUBLICATIONS

"3rd Generation Partnership Project; Technical Specification Group Services and System Aspects Transparent end-to-end Packet switched streaming Service (PSS); Timed text format (Release 8)", 3GPP TS 26.245 V8.0 0, Dec. 2008, 18 pages.

International Search Report issued Sep. 4, 2012 in Application No. PCT/JP2012/067719 (With English Translation).

U.S. Appl. No. 14/355,349, filed Apr. 30, 2014, Dewa.

* cited by examiner

FIG.11

```
moof
 traf
  ttsd {initFlag: "false"}
```

FIG.12

```
TextSample {
unsigned id(16) document-id;
unsigned int(16) text-length;
unsigned int(8) text[text-length];
}
```

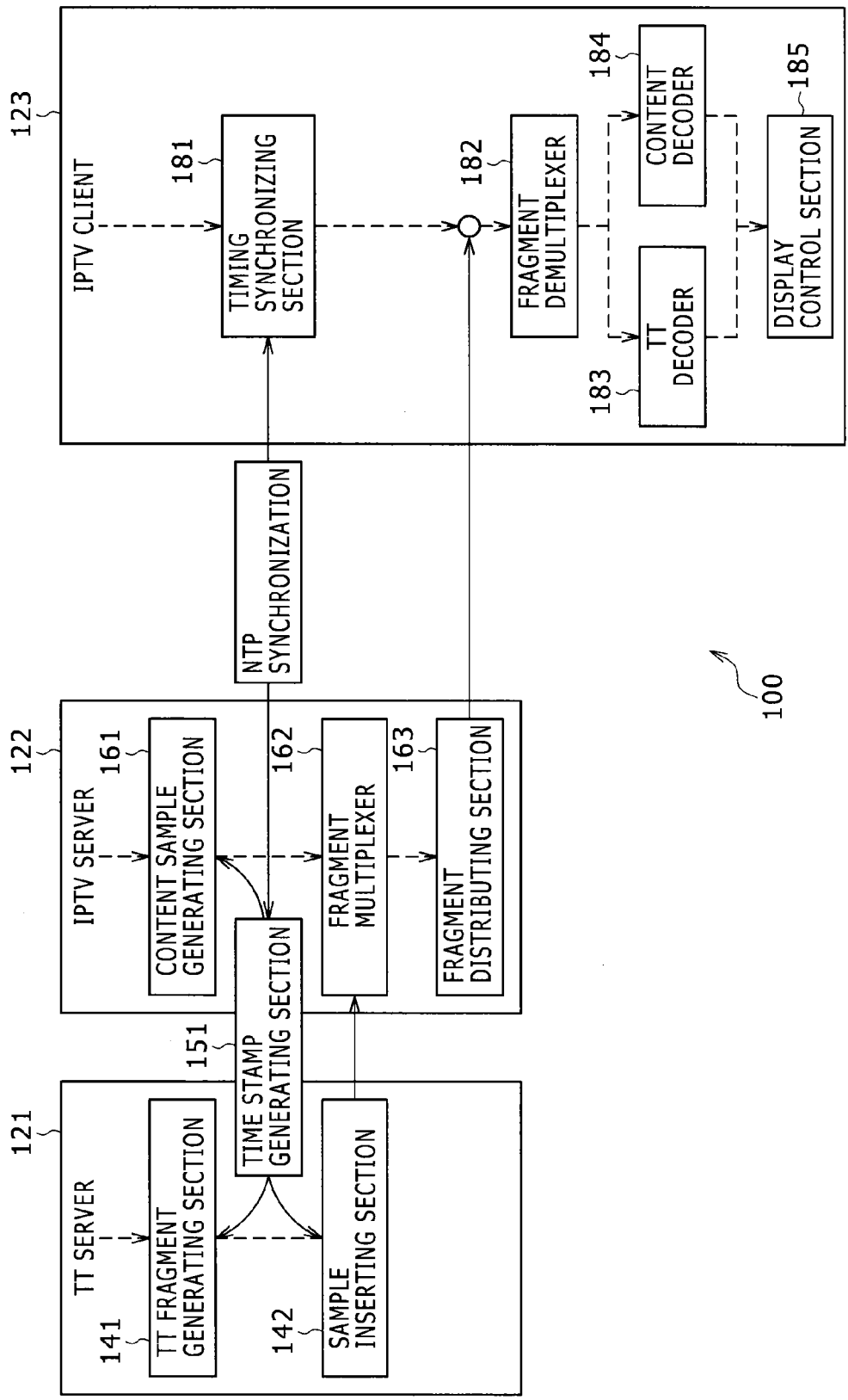

FIG. 14

Initialization Document instance

```
<tt xml:lang="" xmlns="http://www.w3.org/ns/ttml">
 <head>
  <metadata/>
  <styling xmlns:tts="http://www.w3.org/ns/ttml#styling">
  <!-- s1 specifies default color, font, and text alignment -->
  <style xml:id="s1"
    tts:color="white"
    tts:fontFamily="proportionalSansSerif"
    tts:fontSize="22px"
    tts:textAlign="center"
  />
  <!-- alternative using yellow text but otherwise the same as style s1 -->
  <style xml:id="s2" style="s1" tts:color="yellow"/>
  <!-- a style based on s1 but justified to the right -->
  <style xml:id="s1Right" style="s1" tts:textAlign="end" />
  <!-- a style based on s2 but justified to the left -->
  <style xml:id="s2Left" style="s2" tts:textAlign="start" />
  </styling>
  <layout xmlns:tts="http://www.w3.org/ns/ttml#styling">
   <region xml:id="subtitleArea"
    style="s1"
    tts:extent="560px 62px"
    tts:padding="5px 3px"
    tts:backgroundColor="black"
    tts:displayAlign="after"
   />
  </layout>
 </head>
 <body/>
</tt>
```

FIG.15

Body Document instance1

```
<tt>
 <body region="subtitleArea">
  <div>
   <p xml:id="subtitle1">
     It seems a paradox, does it not,
   </p>
  </div>
 </body>
</tt>
```

FIG.16

It seems a paradox, does it not,

FIG.17

Body Document instance2

```
<tt>
 <body region="subtitleArea">
  <div>
   <p xml:id="subtitle2">
      that the image formed on<br/>
      the Retina should be inverted?
   </p>
  </div>
 </body>
</tt>
```

FIG.18 that the image formed on
the Retina should be inverted?

FIG.24

```
moov
  trak
    mdia
      hdlr {HandlerType: "text"}
      minf
        stbl
          stsd (TextSampleEntry("ttml"))
            TTConfig {
              unsigned id(16)   document-id;
              unsigned int(16)  text-length;
              unsigned int(8)   text[text-length];
            }
```

STREAMING DISTRIBUTING DEVICE AND METHOD, STREAMING RECEIVING DEVICE AND METHOD, STREAMING SYSTEM, PROGRAM, AND RECORDING MEDIUM

CROSS-REFERENCE TO RELATED APPLICATION

This application claims the benefit of priority of Provisional Application Ser. No. 61/513,131, filed Jul. 29, 2011, the entire contents of which is incorporated herein by reference.

BACKGROUND

The present technology relates to a device and a method for streaming distribution, a device and a method for streaming reception, a streaming system, a program, and a recording medium, and particularly to a device and a method for streaming distribution, a device and a method for streaming reception, a streaming system, a program, and a recording medium that can reduce a processing load relating to the display of subtitles in streaming.

Standardization in Internet streaming such as IPTV (Interned Protocol Television) and the like for distributing moving images using an IP (Internet Protocol) has recently been under way. For example, standardization of systems applied to VoD (Video on Demand) streaming based on HTTP (HyperText Transfer Protocol) streaming and live streaming has been under way. In work for such standardization, consideration is given to the use of an MP4 file format as a format used in a container layer.

In addition, when there are subtitles as a constituent element of HTTP streaming, TTML (Timed Text Markup Language) defined by the W3C (The World Wide Web Consortium) is often used. TTML is also being adopted by other standardization groups, and is drawing attention as a dominant format.

TTML is principally divided into two types according to the classifications of document instances. One is a document instance referred to as an "Initialization Document instance," which is an instance formed by a description specifying the color, the font, the display position and the like of characters displayed as subtitles, for example. The other is a document instance referred to as a "Body Document instance," which is an instance formed by a description such as a character string actually displayed as subtitles.

When TTML is used, character strings described in "Body Document instances" can be displayed in succession according to the color, the font, the display position and the like of characters, the color, the font, the display position and the like being described in an "Initialization Document instance," for example.

Specifically, a receiver for receiving a stream and making display can be configured to analyze an "Initialization Document instance" first, thereby identify the color, the font, the display position and the like of characters, and thereafter display a character string obtained by analyzing a "Body Document instance." That is, the receiver does not need to analyze a rendering context as defining information such as the color, the font, the display position and the like of characters each time, so that a processing load relating to the display of subtitles can be reduced.

In addition, a stream receiving device capable of realizing efficient band management and efficient channel switching processing on the side of a receiver in an organization format in which a 2D program and a 3D program are mixed with each other has been proposed (see Japanese Patent Laid-Open No. 2011-097227, for example).

SUMMARY

Unlike the contents of movies, dramas, and the like, in a case of subtitles to be inserted into images of live contents such as news, sports relays, and the like, for example, the character strings of the subtitles cannot be determined in advance. Thus, a process of inserting the character strings of the subtitles during broadcasting (streaming) on an as-needed basis is necessary. In such a case, it is desirable to make a receiver receive an "Initialization Document instance" in TTML and analyze a rendering context, and thereafter receive a "Body Document instance" on an as-needed basis.

In addition, there is for example a case in which a rendering context is desired to be changed according to the contents of a character string to be displayed as subtitles (text desired to be emphasized, emotional expression text indicating surprise or perplexity, and the like). In such a case, it is also possible to define a plurality of kinds of rendering contexts by an "Initialization Document instance" in TTML in advance, and thereafter specify a rendering context to be used in a "Body Document instance."

However, the MP4 file format does not define a method for storing a TTML instance with the type of the TTML instance distinguished, and therefore a receiver cannot identify the type of the TTML instance. Thus, a processing load relating to the analysis of rendering contexts has been expected to be reduced in displaying subtitles in Internet streaming such as IPTV or the like.

The present technology is disclosed in view of such a situation, and makes it possible to reduce a processing load relating to the display of subtitles in streaming.

According to a first mode of the present technology, there is provided a streaming distributing device including: a content fragment generating section configured to generate a fragment storing data of a content to be distributed by streaming, the fragment being defined by an MP4 file format; and a subtitle fragment generating section configured to generate a fragment storing a TTML (Timed Text Markup Language) document instance relating to a subtitle to be displayed in the content, the fragment being defined by the MP4 file format. In the streaming distributing device, the subtitle fragment generating section adds, to header information of the fragment, instance classification distinguishing information for distinguishing whether the TTML document instance stored in the fragment is a TTML document instance specifying a rendering context relating to the subtitle.

The subtitle fragment generating section can store, in the fragment, a sample in which the TTML document instance is described, together with description content identifying information for individually identifying a description content of the TTML document instance relating to the subtitle.

The streaming distributing device can further include a movie header generating section configured to add, in header information of a movie including a plurality of fragments, fragment classification distinguishing information for indicating that the movie includes the fragment storing the TTML document instance.

The streaming distributing device can further include a movie header generating section configured to add, in header information of a movie including a plurality of fragments, fragment classification distinguishing information for indicating that the movie includes the fragment storing the TTML document instance. The movie header generating section stores the TTML document instance specifying the rendering context relating to the subtitle in the fragment classification distinguishing information, and the instance classification distinguishing information is not added to the header information of the fragment.

According to the first mode of the disclosed technology, there is provided a streaming distributing method including: a content fragment generating section generating a fragment storing data of a content to be distributed by streaming, the fragment being defined by an MP4 file format; a subtitle fragment generating section configured to generate a fragment storing a TTML (Timed Text Markup Language) document instance relating to a subtitle to be displayed in the content, the fragment being defined by the MP4 file format; and the subtitle fragment generating section configured to add, to header information of the fragment, instance classification distinguishing information for distinguishing whether the TTML document instance stored in the fragment is a TTML document instance specifying a rendering context relating to the subtitle.

According to the first mode of the disclosed technology, there is provided a program for making a computer function as a streaming distributing device, the streaming distributing device including: a content fragment generating section configured to generate a fragment storing data of a content to be distributed by streaming, the fragment being defined by an MP4 file format; and a subtitle fragment generating section configured to generate a fragment storing a TTML (Timed Text Markup Language) document instance relating to a subtitle to be displayed in the content, the fragment being defined by the MP4 file format. In the streaming distributing device, the subtitle fragment generating section adds, to header information of the fragment, instance classification distinguishing information for distinguishing whether the TTML document instance stored in the fragment is a TTML document instance specifying a rendering context relating to the subtitle.

In the first mode of the disclosed technology, a fragment storing data of a content to be distributed by streaming, the fragment being defined by an MP4 file format, is generated, a fragment storing a TTML (Timed Text Markup Language) document instance relating to a subtitle to be displayed in the content, the fragment being defined by the MP4 file format, is generated, and instance classification distinguishing information for distinguishing whether the TTML document instance stored in the fragment is a TTML document instance specifying a rendering context relating to the subtitle is added to header information of the fragment.

According to a second mode of the disclosed technology, there is provided a streaming receiving device including: a movie receiving section configured to receive data of a movie including a plurality of fragments, the fragments being defined by an MP4 file format; a TTML (Timed Text Markup Language) determining section configured to determine whether the movie includes a fragment storing a TTML document instance on a basis of fragment classification distinguishing information indicating that the movie includes the fragment storing the TTML document instance, the fragment classification distinguishing information being added to header information of the movie; and a TTML decoding section configured to extract and decode the fragment storing the TTML document instance when the movie is determined to include the fragment storing the TTML document instance.

The TTML decoding section can distinguish a classification of the TTML document instance stored in the fragment on a basis of instance classification distinguishing information for distinguishing whether the TTML document instance stored in the fragment is a TTML document instance specifying a rendering context relating to a subtitle, the instance classification distinguishing information being included in header information of the fragment, and decode the TTML document instance.

The TTML decoding section can distinguish a classification of the TTML document instance stored in the fragment on a basis of instance classification distinguishing information for distinguishing whether the TTML document instance stored in the fragment is a TTML document instance specifying a rendering context relating to a subtitle, the instance classification distinguishing information being included in header information of the fragment, and the streaming receiving device can further include a decoding determining section configured to determine whether to decode the TTML document instance on a basis of description content identifying information for individually identifying a description content of the TTML document instance relating to the subtitle in a sample stored in the fragment when the TTML document instance stored in the fragment is distinguished as being the TTML document instance specifying the rendering context relating to the subtitle.

When the movie is determined to include the fragment storing the TTML document instance, the TTML decoding section can decode a TTML document instance specifying a rendering context relating to a subtitle, the TTML document instance specifying the rendering context relating to the subtitle being included in the fragment classification distinguishing information.

According to the second mode of the disclosed technology, there is provided a streaming receiving method including: a movie receiving section receiving data of a movie including a plurality of fragments, the fragments being defined by an MP4 file format; a TTML determining section determining whether the movie includes a fragment storing a TTML document instance on a basis of fragment classification distinguishing information indicating that the movie includes the fragment storing the TTML document instance, the fragment classification distinguishing information being added to header information of the movie; and a TTML decoding section extracting and decoding the fragment storing the TTML document instance when the movie is determined to include the fragment storing the TTML document instance.

According to the second mode of the disclosed technology, there is provided a program for making a computer function as a streaming receiving device, the streaming receiving device including: a movie receiving section configured to receive data of a movie including a plurality of fragments, the fragments being defined by an MP4 file format; a TTML determining section configured to determine whether the movie includes a fragment storing a TTML document instance on a basis of fragment classification distinguishing information indicating that the movie includes the fragment storing the TTML document instance, the fragment classification distinguishing information being added to header information of the movie; and a TTML decoding section configured to extract and decode the fragment storing the TTML document instance when the movie is determined to include the fragment storing the TTML document instance.

In the second mode of the disclosed technology, data of a movie including a plurality of fragments, the fragments being defined by an MP4 file format, is received, whether the movie includes a fragment storing a TTML document instance is determined on a basis of fragment classification distinguishing information indicating that the movie includes the fragment storing the TTML document instance, the fragment classification distinguishing information being added to header information of the movie, and when the movie is determined to include the fragment storing the TTML document instance, the fragment storing the TTML document instance is extracted and decoded.

According to a third mode of the disclosed technology, there is provided a streaming system including: a streaming distributing device including a content fragment generating section configured to generate a fragment storing data of a content to be distributed by streaming, the fragment being defined by an MP4 file format, and a subtitle fragment generating section configured to generate a fragment storing a TTML (Timed Text Markup Language) document instance relating to a subtitle to be displayed in the content, the fragment being defined by the MP4 file format. In the streaming distributing device, the subtitle fragment generating section is configured to add, to header information of the fragment, instance classification distinguishing information for distinguishing whether the TTML document instance stored in the fragment is a TTML document instance specifying a rendering context relating to the subtitle. The streaming system further includes a streaming receiving device including a movie receiving section configured to receive data of a movie including a plurality of fragments, the fragments being defined by the MP4 file format, a TTML determining section configured to determine whether the movie includes the fragment storing the TTML document instance on a basis of fragment classification distinguishing information indicating that the movie includes the fragment storing the TTML document instance, the fragment classification distinguishing information being added to header information of the movie, and a TTML decoding section configured to extract and decode the fragment storing the TTML document instance when the movie is determined to include the fragment storing the TTML document instance.

In the third mode of the disclosed technology, a fragment storing data of a content to be distributed by streaming, the fragment being defined by an MP4 file format, is generated, a fragment storing a TTML (Timed Text Markup Language) document instance relating to a subtitle to be displayed in the content, the fragment being defined by the MP4 file format, is generated, and instance classification distinguishing information for distinguishing whether the TTML document instance stored in the fragment is a TTML document instance specifying a rendering context relating to the subtitle is added to header information of the fragment. In addition, data of a movie including a plurality of fragments, the fragments being defined by the MP4 file format, is received, whether the movie includes the fragment storing the TTML document instance is determined on a basis of fragment classification distinguishing information indicating that the movie includes the fragment storing the TTML document instance, the fragment classification distinguishing information being added to header information of the movie, and when the movie is determined to include the fragment storing the TTML document instance, the fragment storing the TTML document instance is extracted and decoded.

According to the present technology, it is possible to reduce a processing load relating to the display of subtitles in streaming.

BRIEF DESCRIPTION OF THE DRAWINGS

FIG. 11 is a diagram showing a configuration of the "BOX" of "moof" in a case of a "Body Document instance";

FIG. 12 is a diagram of assistance in explaining the description format of a "Sample" of "mdat" when a TTML document instance is stored;

FIG. 13 is a block diagram showing an example of configuration of a streaming system according to an embodiment of the present technology;

FIG. 14 is a diagram showing an example of the description of an "Initialization Document instance";

FIG. 15 is a diagram showing an example of the description of a "Body Document instance";

FIG. 16 is a diagram showing a subtitle displayed on the basis of the "Body Document instance" of FIG. 15;

FIG. 17 is a diagram showing another example of the description of a "Body Document instance";

FIG. 18 is a diagram showing a subtitle displayed on the basis of the "Body Document instance" of FIG. 17;

FIG. 24 is a diagram of assistance in explaining another configuration of the "BOX" of "moov";

DETAILED DESCRIPTION OF THE PREFERRED EMBODIMENTS

Preferred embodiments of the technology disclosed herein will hereinafter be described with reference to the drawings.

Description will first be made of TTML (Timed Text Markup Language). TTML is a markup language defined by the W3C (The World Wide Web Consortium), and can specify the display position (layout), timing of display and the like of text.

For example, when information described in TTML is transmitted from a server, and analyzed by a client, a predetermined character string can be displayed at a specified time, in a specified font, and in a specified area on the display of the client. When information described in TTML is thus used, display of subtitles in synchronism with the image and audio of contents, for example, can be realized easily.

TTML is formed by an aggregate of text referred to as document instances. Document instances are principally classified into two types. One is a document instance referred to as an "Initialization Document instance," which is an instance formed by a description specifying the color, the font, the display position and the like of characters displayed as subtitles, for example. The other is a document instance referred to as a "Body Document instance," which is an instance formed by a description such as a character string actually displayed as subtitles.

Figure 1:
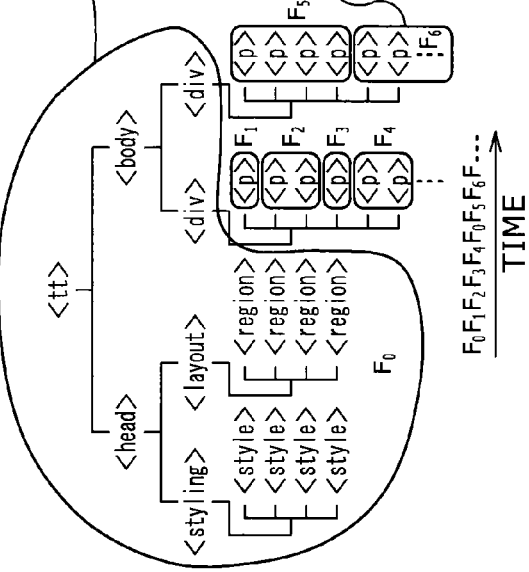
FIG. 1 is a diagram of assistance in explaining a configuration of TTML.

FIG. 1 is a diagram of assistance in explaining a configuration of TTML.

An instance 21 shown in FIG. 1 is an "Initialization Document instance." Tags such as "head," "styling," "layout," . . . are described in this instance 21. The tags of "styling" and "layout" specify a rendering context such as the color, the font, the display position and the like of characters displayed as subtitles.

In addition, in this example, a rendering context "s1" is defined by a description "<region xml:id="subtitleArea"style="s1" . . . ." A plurality of kinds of rendering contexts such as "s1," "s2," . . . can be defined in one "Initialization Document instance," for example.

An instance 22 in FIG. 1 is a "Body Document instance." Tags such as "body," "div," "p," . . . are described in this instance 22. For example, a description "<p xml:id= . . . >" specifies a character string of subtitles as well as the display start time and the display end time of the character string.

Thus, TTML is a description having a hierarchical structure formed by a combination of the instance 21 and the instance 22. The hierarchical structure formed by the combination of the instance 21 and the instance 22 is shown on the left side of the instance 22 in FIG. 1.

For example, by making a receiver for receiving and displaying a stream receive and analyze the TTML shown in FIG. 1, a predetermined character string can be displayed in a predetermined time period in the contents. That is, subtitle display is changed on the display of the receiver as appropriate on the basis of a character string, a display start time, and a display end time specified by a tag of "p" in the instance 22. In the example of FIG. 1, a character string F1, a character string F2 . . . specified by tags of "p" in the instance 22 are selected and displayed with the passage of time.

Incidentally, details of TTML are disclosed in Timed Text Markup Language (TTML) 1.0 and the like.

Description will next be made of an MP4 file format. The MP4 file format offers a high degree of freedom, and is defined such that an MP4 file is formed by a collection of data of various sizes referred to as a "BOX." There are various kinds of "BOX," which can be increased freely.

Figure 2:
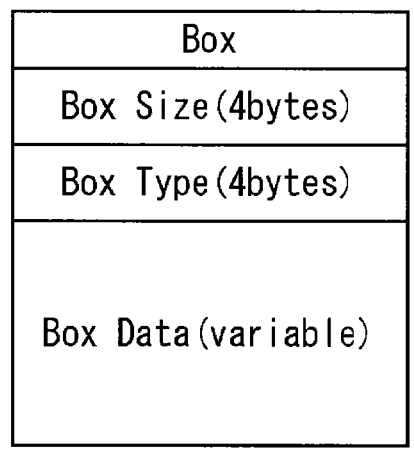
FIG. 2 is a diagram showing a configuration of a "BOX" in an MP4 file format.

FIG. 2 shows a configuration of a "BOX" in the MP4 file format. A size and a type (kind) of the "BOX" in question are described in areas shown as "Box Size" and "Box Type." An area shown as "Box Data" stores for example encoded video data, audio data, subtitle data or the like.

Figure 3:
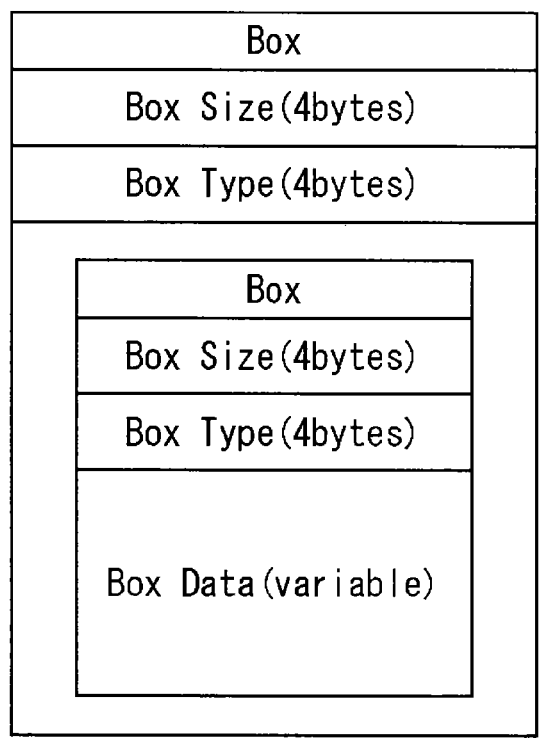
FIG. 3 is a diagram of assistance in explaining a hierarchical structure of a "BOX"

In addition, the MP4 file format is defined such that the above-described "BOX" has a hierarchical structure. Specifically, as shown in FIG. 3, a "BOX" in a lower layer can be stored in the area "Box Data" of a "BOX" in a higher layer.

Figure 4:
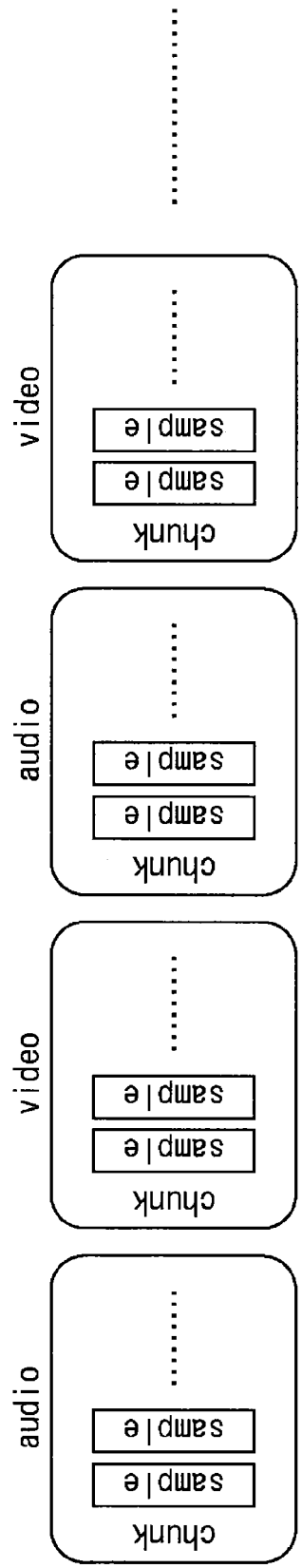
FIG. 4 is a diagram of assistance in explaining streaming using the MP4 file format.

In the MP4 file format, unit data of contents to be transmitted such as decoding unit of audio data and one frame of video data, for example, is referred to as a "Sample." A plurality of samples form a "Chunk." For example, as shown in FIG. 4, "Chunks" of audio and "Chunks" of video form a stream.

In the MP4 file format, an aggregate of a series of "Chunks" of video or an aggregate of a series of "Chunks" of audio, for example, is referred to as a "Track." Data formed by integrating a plurality of tracks is referred to as a "Movie."

Figure 5:
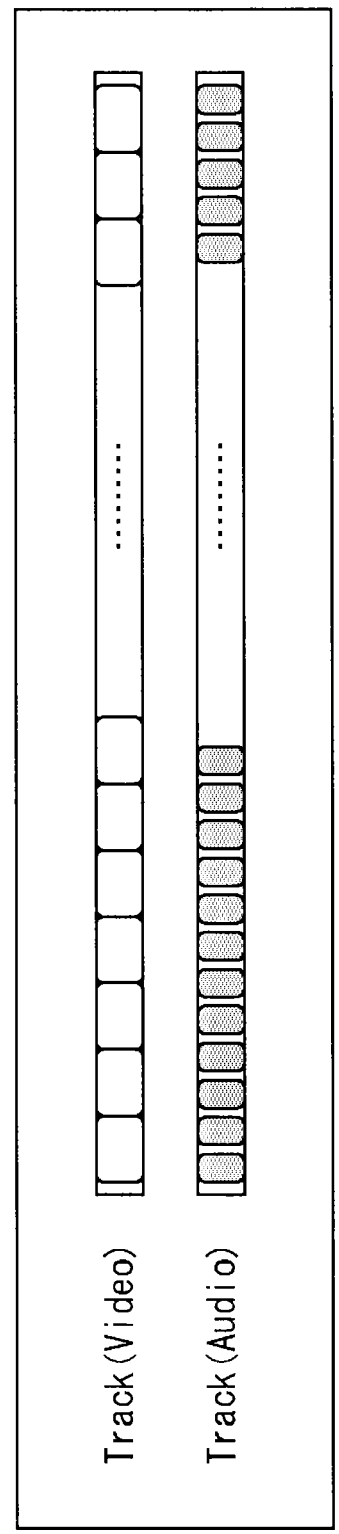
FIG. 5 is a diagram of assistance in explaining a configuration of a "Movie"

FIG. 5 is a diagram of assistance in explaining a configuration of a "Movie." In the example of FIG. 5, video "Tracks" and audio "Tracks" form one "Movie."

Figure 6:
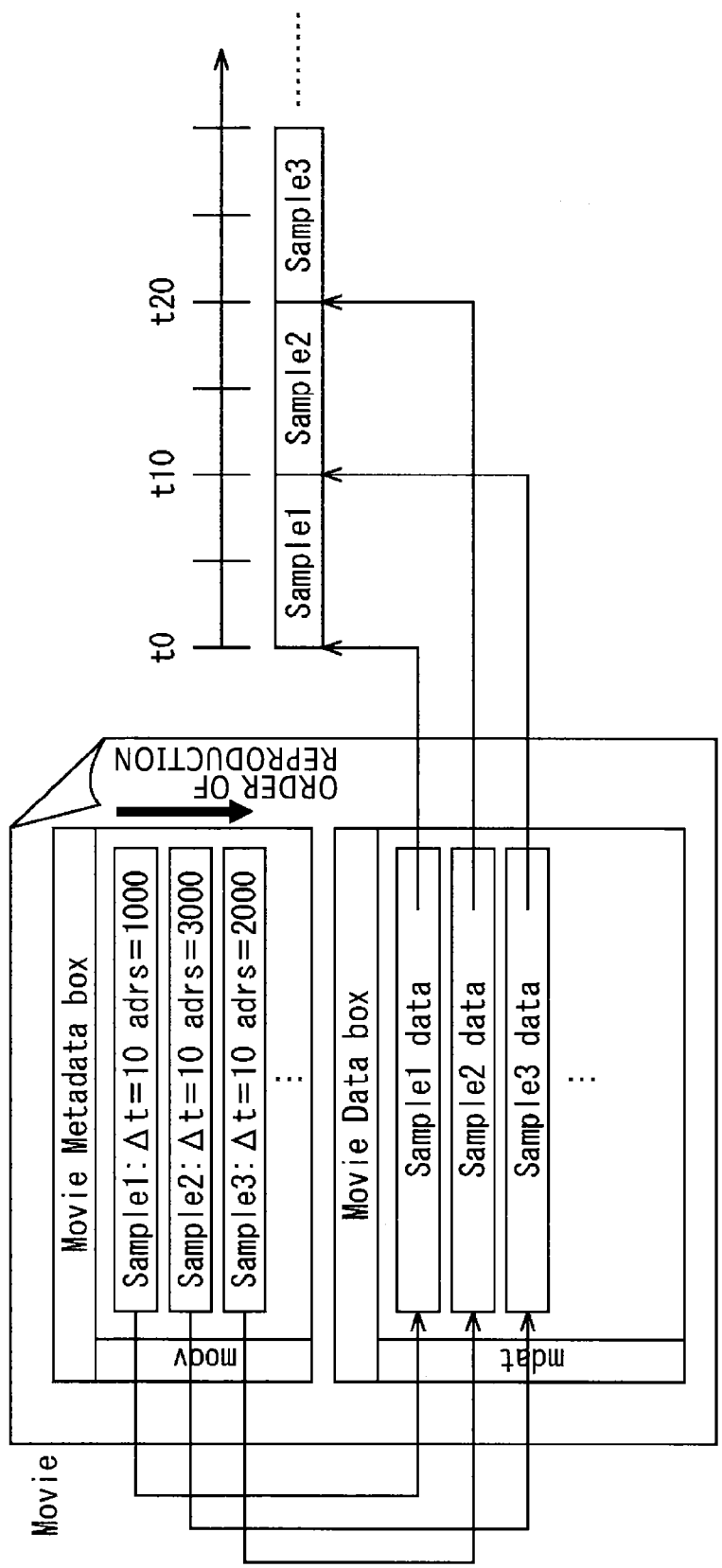
FIG. 6 is a diagram of assistance in explaining a "BOX" structure in a "Movie"

A "Movie" has a "BOX" structure as described above. FIG. 6 is a diagram of assistance in explaining a "BOX" structure in a "Movie." In the example of FIG. 6, a "Movie Metadata box" and a "Movie Data box" are stored in the "BOX" of a "Movie."

The "Movie Metadata box" is a "BOX" describing information (such as "adrs=1000" or the like) relating to the storage position of each "Sample" stored in the "Movie Data box" and information (such as "Δt=10" or the like) relating to a reproduction time and a reproduction duration. The "Movie Metadata box" also describes a codec parameter and the like as required. The "Movie Data box" is a "BOX" storing each "Sample." Incidentally, in the standards of the MP4 file format, the "Movie Metadata box" is referred to as a "moov," and the "Movie Data box" is referred to as an "mdat."

When a "Movie" as shown in FIG. 6 is received and analyzed by a receiver, Sample1, Sample2, Sample3, . . . can be reproduced at time t0, time t10, time t20, . . . , respectively.

In addition, "Movies" are roughly classified into two types. One is referred to as a "Non-fragment Movie," which is suitable for the transmission of contents such for example as movies, dramas, and the like. The other is referred to as a "Fragmented Movie," which is suitable for the transmission of live contents such as news, sports relays, and the like.

Figure 7:
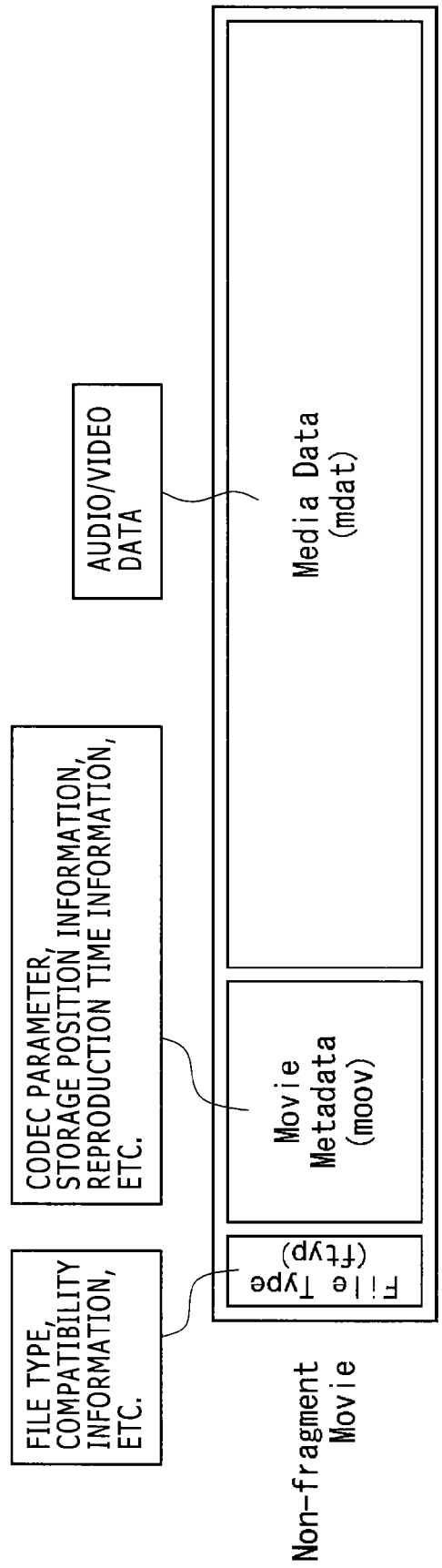
FIG. 7 is a diagram of assistance in explaining a configuration of a "Non-fragment Movie"

FIG. 7 is a diagram of assistance in explaining a configuration of a "Non-fragment Movie."

As shown in FIG. 7, a "BOX" referred to as a "File Type (ftyp)" is disposed at the head of the "Non-fragment Movie." The "File Type (ftyp)" is a "BOX" storing a file type, compatibility information, and the like.

Following "(ftyp)," a "moov" described above is disposed, and an "mdat" described above is disposed. As described above, the "moov" describes a codec parameter, storage position information, reproduction time information, and the like. The "moov" is, as it were, header information in the whole of the "Movie." In addition, as described above, the "mdat" stores "Samples" formed by a decoding unit of audio data, one frame of video data, and the like.

In the "Non-fragment Movie," the "moov" defines the rendering context of the whole of the "Movie." Specifically, in the case of contents such as movies, dramas, and the like, timing in which to reproduce images, audio, and subtitles is known in advance, and therefore the rendering context of the whole of the "Movie" can be defined before each "Sample" is received.

In the case of live contents such as news, sports relays, and the like, timing in which to reproduce images, audio, and subtitles is not known in advance. Thus, a "Fragmented Movie" is used for the transmission of live contents.

Figure 8:
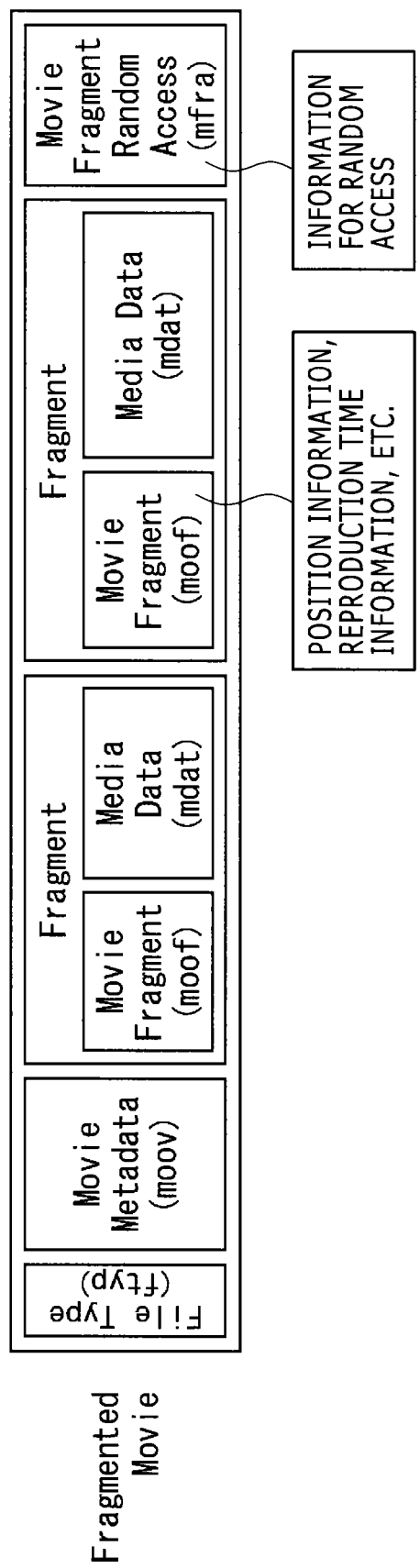
FIG. 8 is a diagram of assistance in explaining a configuration of a "Fragmented Movie"

FIG. 8 is a diagram of assistance in explaining a configuration of a "Fragmented Movie."

As shown in FIG. 8, the "Fragmented Movie" has an "ftyp" and a "moov" as in the case of the "Non-fragment Movie." However, the "ftyp" and the "moov" are followed by a plurality of "BOXs" referred to as "Fragments." A "Fragment" includes a "BOX" referred to as a "Movie Fragment (moof)" and an "mdat."

As shown in FIG. 8, each "Fragment" has a "moof," and the "moof" is, as it were, the header information of the "Fragment." The "moof" describes storage position information, reproduction time information, and the like relating to a "Sample" of the "mdat" stored in the "Fragment" in question.

That is, in the "Fragmented Movie," unlike the "Non-fragment Movie," a rendering context is defined in each "Fragment."

Incidentally, "Movie Fragment Random Access (mfra)" shown in FIG. 8 is a "BOX" inserted at an end of the "Fragmented Movie," and the "Movie Fragment Random Access (mfra)" stores information for random access and the like.

Incidentally, the examples shown in FIG. 7 and FIG. 8 represent configurations of "Movies" as the MP4 file format. When Internet streaming or the like is performed, for example, the data described above with reference to FIG. 7 and FIG. 8 is distributed in a predetermined transmission format. In this transmission format, for example, the "moov" shown in FIG. 8 is inserted between "Fragments," and distributed repeatedly a plurality of times.

Standardization in Internet streaming such as IPTV and the like for distributing moving images using an IP (Internet Protocol) has recently been under way. For example, standardization of systems applied to VoD (Video on Demand) streaming based on HTTP (HyperText Transfer Protocol) streaming and live streaming has been under way. In work for such standardization, consideration is given to the use of the MP4 file format as a format used in a container layer.

In addition, when there are subtitles as a constituent element of streaming, TTML is often used, and is drawing attention also in the standardization of streaming.

For example, when subtitles are to be inserted into images of live contents such as news, sports relays, and the like, the character strings of the subtitles necessary be determined in advance. Thus, a process of inserting the character strings of the subtitles during broadcasting (streaming) on an as-needed basis is necessary. In such a case, it is desirable, for example, to make a receiver receive an "Initialization Document instance" in TTML and analyze a rendering context, and thereafter receive a "Body Document instance" on an as-needed basis.

In addition, there is for example a case in which a rendering context is desired to be changed according to the contents of a character string to be displayed as subtitles (text desired to be emphasized, emotional expression text indicating surprise or perplexity, and the like) even in same contents. In such a case, it is also possible to define a plurality of kinds of rendering contexts by an "Initialization Document instance" in TTML in advance, and thereafter specify a rendering context to be used in a "Body Document instance."

However, the MP4 file format does not define a method for storing a TTML instance with the type of the TTML instance distinguished, and therefore a receiver necessary identify the type of the TTML instance. Thus, in the past, in Internet streaming such as IPTV or the like transmitted in the MP4 file format, there has been no other choice but to analyze a rendering context each time together with a character string to be displayed as subtitles, for example. In such a situation, a processing load relating to the analysis of rendering contexts has been expected to be reduced in displaying subtitles in Internet streaming such as IPTV or the like.

Accordingly, the present technology makes it possible to store TTML instances with the types of the TTML instances distinguished, using the MP4 file format, as follows.

The present technology is assumed to be applied to a case of inserting subtitles in contents transmitted as a "Fragmented Movie." Then, a TTML document instance is stored and transmitted as a "Sample" of "mdat" in a "Fragment." That is, the instance 21 or the instance 22 in FIG. 1 or the like is stored as appropriate as a "Sample" of "mdat" in a "Fragment" in order to display subtitles to be inserted into contents being streamed.

First, the present technology makes it possible to identify Internet streaming as including information described in TTML on the basis of information described in the "BOX" of the "moov." Specifically, the present technology makes it possible to provide a description in "moov.trak.mdia.minf.stbl.stsd" which description indicates that information described in TTML is included.

Figure 9:
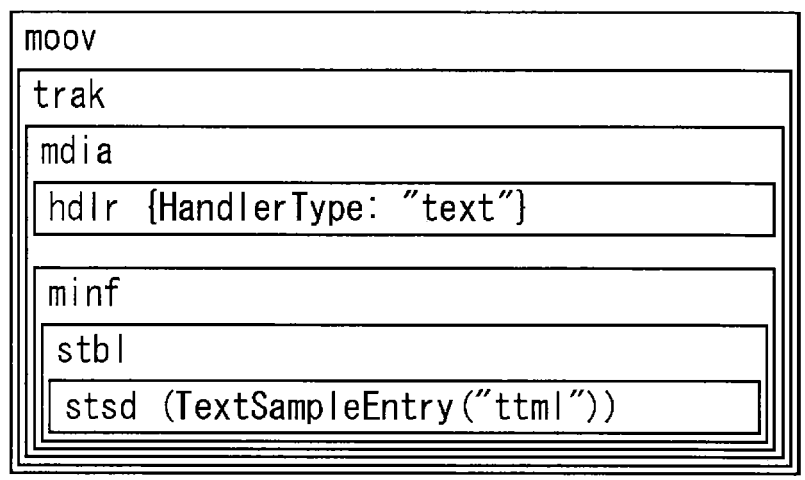
FIG. 9 is a diagram of assistance in explaining a configuration of the "BOX" of "moov"

FIG. 9 is a diagram of assistance in explaining a configuration of the "BOX" of the "moov." As described above, the "BOX" employs a hierarchical structure. A "BOX" referred to as "stsd" is provided as a "BOX" in a lower layer than the "BOX" of the "moov" (described as "moov.trak.mdia.minf.stbl.stsd"). "stsd" is a "BOX" for storing header information for track data reproduction.

In the present technology, when information described in TTML is included, 4CC (four_character_code) "ttml" is described in "sampleEntry" of "stsd." Incidentally, standards in the past specify that 4CC "MP4A" denoting audio data, 4CC "MP4V" denoting video data, and the like are stored in "stsd."

In addition, when information described in TTML is included, a description "text" is provided in "HandlerType" of "moov.trak.mdia.hdlr."

Further, the present technology makes it possible to distinguish whether the TTML document instance stored as a "Sample" of "mdat" in the "Fragment" in question is an "Initialization Document instance" or a "Body Document instance" on the basis of information described in the "BOX" of "moof."

Specifically, a "BOX" referred to as "ttsd" is newly provided as a "BOX" in a lower layer than a "BOX" referred to as "traf" in the "BOX" of "moof." When "initFlag" of "ttsd" is described as "true," it is indicated that the TTML document instance stored in the "Fragment" in question is an "Initialization Document instance." In addition, when "initFlag" of "ttsd" is described as "false," it is indicated that the TTML document instance stored in the "Fragment" in question is a "Body Document instance."

Figure 10:
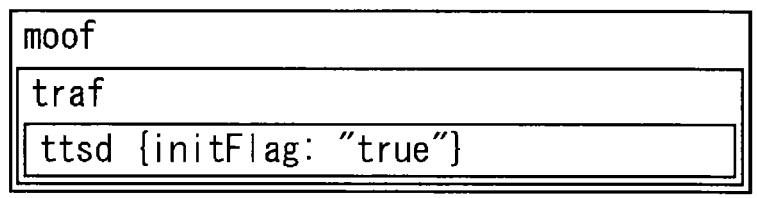
FIG. 10 is a diagram showing a configuration of the "BOX" of "moof" in a case of an "Initialization Document instance"

FIG. 10 is a diagram showing a configuration of the "BOX" of "moof" when the TTML document instance stored in the "Fragment" in question is an "Initialization Document instance." As shown in FIG. 10, "traf" is present in a lower layer than "moof," and "ttsd" is provided as a "BOX" in an even lower layer. A description "initFlag: 'true'" is provided as information stored in "ttsd."

FIG. 11 is a diagram showing a configuration of the "BOX" of "moof" when the TTML document instance stored in the "Fragment" in question is a "Body Document instance." As shown in FIG. 11, "traf" is present in a lower layer than "moof," and "ttsd" is provided as a "BOX" in an even lower layer. A description "initFlag: 'false'" is provided as information stored in "ttsd."

Further, the present technology makes it possible for a receiver to determine whether the description contents of a TTML document instance transmitted to the receiver are changed (updated). Specifically, a format of description of a "Sample" of "mdat" when a TTML document instance is stored is defined as shown in FIG. 12, for example.

In the present technology, a field "unsigned id(16) document-id;" shown in FIG. 12 is newly provided. An identifier for identifying the TTML document instance described in the "Sample" in question is described in the field "unsigned id(16) document-id;." This identifier is for example an ID or a version given to each document instance. As a matter of course, when the document instance is changed, the above identifier is also changed. Thus, the receiver can determine whether the document instance is changed or not.

In addition, a field "unsigned int(16) text-length;" shown in FIG. 12 stores the text length of text stored in a field "unsigned int(8) text[text-length];." The TTML document instance is stored in the field "unsigned int(8) text[text-length];" shown in FIG. 12.

When contents are broadcast by streaming on a plurality of channels, for example, it is not known at which time a viewer selects which channel, so that the definition information of a rendering context (that is, an "Initialization Document instance") needs to be transmitted periodically. In this case, a processing load on the receiver is increased when the receiver is made to parse the "Initialization Document instance" each time the receiver receives the "Initialization Document instance," and it is therefore desirable that a subsequent rendering context be defined on the basis of the "Initialization Document instance" parsed once.

However, when the contents of the "Initialization Document instance" are updated, the rendering context is changed. The receiver therefore needs to perform parsing anew. Thus, as described above, the present technology makes it possible for the receiver to determine whether the description contents of the transmitted TTML document instance are changed (updated) or not.

Summarizing the above, in the present technology, "ttml" is provided as new 4CC (four_character_code) described in "sampleEntry" of "stsd" in "moov." Then, it is made possible to determine that a TTML document instance is stored in the "Fragment" by referring to the description of "stsd" in "moov."

In addition, in the present technology, "ttsd" is provided as a "BOX" in a lower layer than "moof" of each "Fragment." Then, "initFlag: 'true'" or "initFlag: 'false'" is described as information stored in "ttsd" to make it possible to distinguish whether the TTML stored in the "Fragment" in question is an "Initialization Document instance" or a "Body Document instance."

Further, in the present technology, a field "unsigned id(16) document-id;" is provided in a "Sample" of "mdat." Then, it is made possible to determine whether the description contents of a TTML document instance are changed (updated) or not on the basis of an identifier stored in the field.

Thus, when a TTML document instance is transmitted using the MP4 file format, the TTML instance can be stored with the type of the TTML instance distinguished, and an update to description contents can be identified easily. Thus, according to the present technology, it is possible for example to reduce a processing load relating to the display of subtitles in streaming such as IPTV or the like.

FIG. 13 is a block diagram showing an example of configuration of a streaming system according to an embodiment of the present technology. The streaming system 100 shown in FIG. 13 includes a TT (Timed Text) server 121, an IPTV server 122, and an IPTV client 123.

The IPTV server 122 shown in FIG. 13 is for example configured as a transmitter for streaming broadcasting of contents. The IPTV client 123 shown in FIG. 13 is for example configured as a receiver for receiving streaming broadcasting. The TT server 121 is for example a device for generating data relating to subtitles to be inserted into the contents to be broadcast by streaming broadcasting.

The TT server 121 includes a TT (Timed Text) fragment generating section 141 and a sample inserting section 142.

The TT fragment generating section 141 describes 4CC "ttml" in "sampleEntry" of "stsd" in "moov," and describes "text" in "HandlerType" of "moov.trak.mdia.hdlr." (This process is less frequent than the generation of a "Fragment" to be described later.) In addition, the TT fragment generating section 141 generates the data of a "Fragment" in which a TTML document instance is stored as described above with reference to FIG. 8. At this time, the TT fragment generating section 141 provides "ttsd" as a "BOX" in a lower layer than "moof." Then, the TT fragment generating section 141 describes "initFlag: 'true'" or "initFlag: 'false'" as information stored in "ttsd" according to the type of a generated document instance.

For example, when the TTML document instance stored in the "Fragment" in question is an "Initialization Document instance," "initFlag: 'true'" is described as information stored in "ttsd." In addition, for example, when the TTML document instance stored in the "Fragment" in question is a "Body Document instance," "initFlag: 'false'" is described as information stored in "ttsd."

The sample inserting section 142 generates the TTML document instance, and inserts the TTML document instance as a "Sample" of "mdat" in the "Fragment" generated by the TT fragment generating section 141.

At this time, as described above with reference to FIG. 12, the sample inserting section 142 provides a field "unsigned id(16) document-id;." Then, the sample inserting section 142 describes an identifier for identifying the TTML document instance described in the "Sample" in question in the field "unsigned id(16) document-id;." Incidentally, when the document instance is changed, the above identifier is also changed.

In addition, a time stamp generated by an NTP-synchronized time stamp generating section 151 is supplied to the TT fragment generating section 141 and the sample inserting section 142 as appropriate.

The IPTV server 122 includes a content sample generating section 161, a fragment multiplexer 162, and a fragment distributing section 163.

The content sample generating section 161 for example encodes sound data and image data or the like forming contents, and generates audio data and video data or the like. Then, on the basis of the audio data and the video data or the like, the content sample generating section 161 generates the data of a "Sample."

The fragment multiplexer 162 generates a "Fragment" whose "mdat" includes the data of the "Sample" generated by the content sample generating section 161. The fragment multiplexer 162 then multiplexes the "Fragment" generated by the TT server 121 and the "Fragment" generated by the fragment multiplexer 162 itself. That is, the "Fragment" storing video data, audio data or the like and the "Fragment" storing the TTML document instance are multiplexed.

The fragment distributing section 163 distributes a "Fragmented Movie" including the "Fragments" multiplexed by the fragment multiplexer 162 via a network or the like. Thereby, the contents are distributed by streaming.

Incidentally, the time stamp generated by the NTP-synchronized time stamp generating section 151 is supplied to the content sample generating section 161 and the fragment multiplexer 162 as appropriate.

The IPTV client 123 includes a timing synchronizing section 181, a fragment demultiplexer 182, a TT (Timed Text) decoder 183, a content decoder 184, and a display control section 185.

The timing synchronizing section 181 supplies NTP-synchronized time information to each part.

The fragment demultiplexer 182 receives the "Fragmented Movie" transmitted from the IPTV server 122 via the network or the like, and extracts each "Fragment" forming the "Fragmented Movie." Then, the fragment demultiplexer 182 analyzes the description of "sampleEntry" of "stsd" in "moov" to determine whether there is a "Fragment" storing a TTML document instance in the "Fragmented Movie" in question. That is, when the description of "sampleEntry" of "stsd" in "moov" is "ttml," it is determined that there is a "Fragment" storing a TTML document instance in the "Fragmented Movie" in question.

When it is determined that there is a "Fragment" storing a TTML document instance, the fragment demultiplexer 182 checks "ttsd" in "moof" of each "Fragment" to determine whether the "Fragment" in question stores a TTML document instance. That is, a "Fragment" having "ttsd" provided in a lower layer than "moof" is determined to be a "Fragment" storing a TTML document instance, and is supplied to the TT decoder 183. On the other hand, a "Fragment" not provided with "ttsd" in "moof" is determined to be a "Fragment" not storing a TTML document instance (a "Fragment" of audio data, video data, or the like), and is supplied to the content decoder 184.

The TT decoder 183 is a functional block for decoding the data of a "Sample" storing a TTML document instance. Incidentally, decoding in the TT decoder 183 principally means the parsing of a TTML document instance.

On the basis of the description of "ttsd" in "moof" of each "Fragment," the TT decoder 183 determines the type of a TTML document instance stored in the "Fragment" in question. That is, when the description of "ttsd" is "initFlag: 'true'," it is determined that the "Fragment" in question stores an "Initialization Document instance." When the description of "ttsd" is "initFlag: 'false'," on the other hand, it is determined that the "Fragment" in question stores a "Body Document instance."

When determining that an "Initialization Document instance" is stored, the TT decoder 183 stores an identifier described in the field "unsigned id(16) document-id;" of a "Sample" of "mdat" in the "Fragment." Then, the TT decoder 183 analyzes the description of the "Initialization Document instance" stored in the "Sample" of the "mdat," and sets a rendering context.

The TT decoder 183 thereafter compares the identifier described in the field "unsigned id(16) document-id;" with an identifier stored in advance to determine whether the "Initialization Document instance" is changed. Only when determining that the "Initialization Document instance" is changed, the TT decoder 183 analyzes the description of the "Initialization Document instance" stored in a "Sample" of "mdat," and sets a rendering context again.

In addition, when determining that a "Body Document instance" is stored, the TT decoder 183 analyzes the "Body Document instance" stored in the "Sample" of "mdat," and generates subtitle display data. The subtitle display data generated in the TT decoder 183 is supplied to the display control section 185 together with information relating to display time.

The content decoder 184 decodes audio data and video data or the like stored in the "Samples" of "mdat," and generates image display data and sound output data or the like. The image display data and sound output data or the like generated in the content decoder 184 are supplied to the display control section 185 together with information relating to display time and output time or the like.

The display control section 185 generates an image signal to display subtitles in a state of being superimposed on the image of contents on the basis of the information relating to the display time and the like. The display control section 185 supplies the image signal to a display not shown in the figure or the like. In addition, the display control section 185 generates a sound signal to output the sound of the contents on the basis of the information relating to the output time and the like. The display control section 185 supplies the sound signal to a speaker not shown in the figure or the like.

Such a streaming system 100 can for example control the display of subtitles as follows.

For example, a TTML document instance as shown in FIG. 14 is stored in a "Fragment" by the TT server 121, and distributed from the IPTV server 122. FIG. 14 is an example of the description of an "Initialization Document instance."

Then, a TTML document instance as shown in FIG. 15 is stored in a "Fragment" by the TT server 121, and distributed from the IPTV server 122. FIG. 15 is an example of the description of a "Body Document instance."

When a character string specified by the description in FIG. 15 is displayed in the rendering context set according to the description in FIG. 14, a subtitle as shown in FIG. 16 can be displayed, for example.

Thereafter, a TTML document instance as shown in FIG. 17 is stored in a "Fragment" by the TT server 121, and distributed from the IPTV server 122. FIG. 17 is another example of the description of a "Body Document instance."

When a character string specified by the description in FIG. 17 is displayed in the rendering context set according to the description in FIG. 14, a subtitle as shown in FIG. 18 can be displayed, for example.

Incidentally, the character strings specified by tags "<p>" in the "Body Document instances" are the character strings of the subtitles. When a time is specified within a tag "<p>," the character string is displayed according to the time specification. When there is no time specification, or when only a display period (duration) is specified, display is controlled to be started at a reproduction time identified as "decodingTime" in the "Sample" in question.

Figure 19:
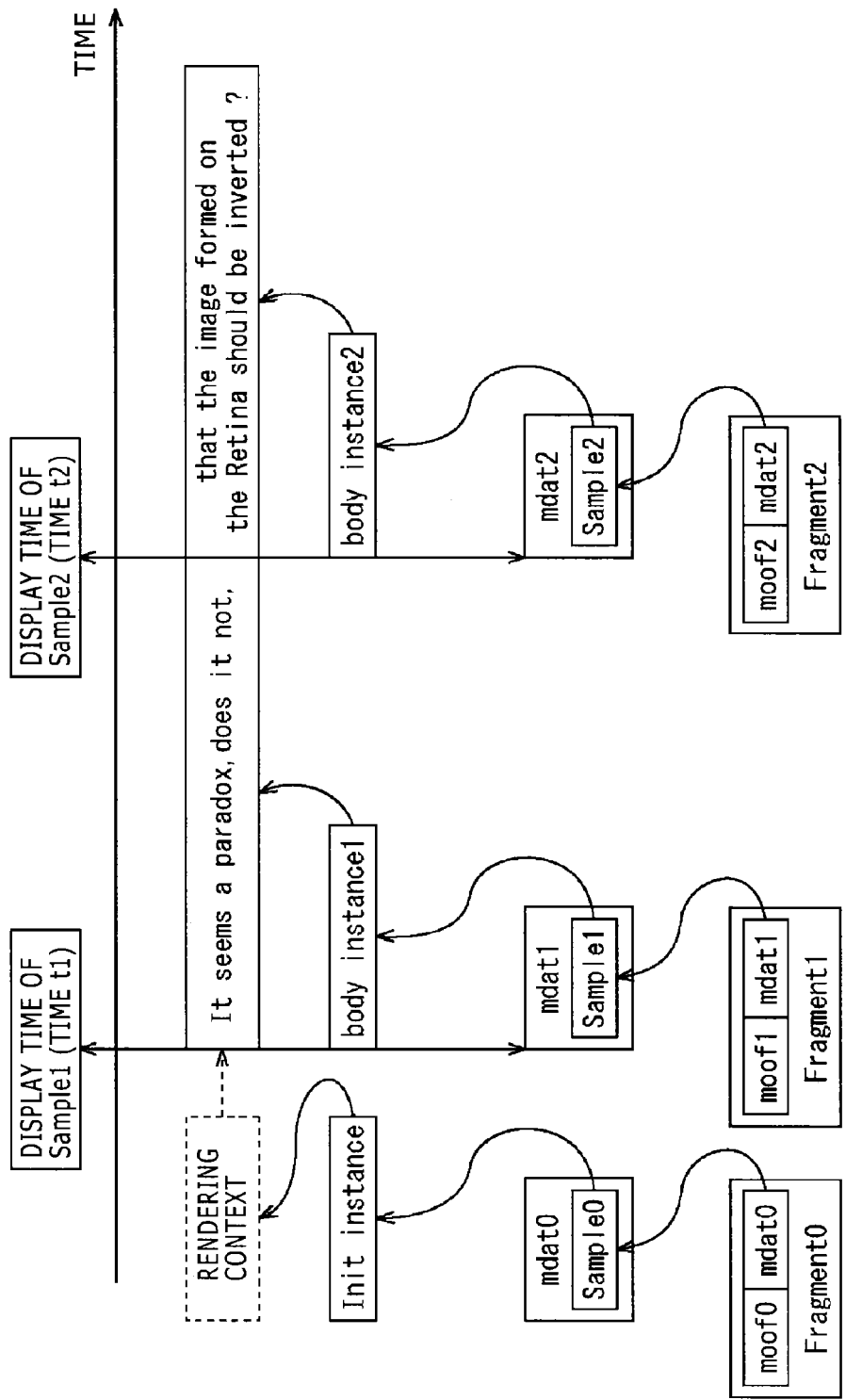
FIG. 19 is a diagram of assistance in explaining an example of display of subtitles.

Specifically, as shown in FIG. 19, TTML document instances stored as "Samples" of "mdat" in respective "Fragments," that is, Fragment0, Fragment1, and Fragment2 are analyzed, and subtitles are displayed.

In this case, suppose that the "Initialization Document instance" (Init instance) shown in FIG. 14 is stored in mdat0 of Fragment0. In addition, suppose that the "Body Document instance" (Body instance1) shown in FIG. 15 is stored in mdat1 of Fragment1. Further, suppose that the "Body Document instance" (Body instance2) shown in FIG. 17 is stored in mdat2 of Fragment2.

In the example of FIG. 19, a rendering context is set on the basis of the Init instance stored in the Sample0 of mdat0 in Fragment0. Thereafter, at time t1, a subtitle as shown in FIG. 16 is displayed on the basis of the Body instance1 stored in the Sample1 of mdat1 in Fragment1. Further, thereafter, at time t2, a subtitle as shown in FIG. 18 is displayed on the basis of the Body instance2 stored in the Sample2 of mdat2 in Fragment2.

Incidentally, time t1 and time t2 described above are calculated on the basis of moov.trak.mdia.minf.stbl.stts or the "decoding times" of first "Samples" stored in first mdat corresponding to the moofs which decoding times are described in moof.traf.tfdt.

That is, in order to identify the display time of a character string described in a TTML document instance, the presentation time of an MP4 file "Sample" storing the document instance is used.

An example of a streaming distribution process by the IPTV server 122 in FIG. 13 will next be described with reference to a flowchart of FIG. 20. This process is for example performed in a case of distributing live contents as a "Fragmented Movie" via a network or the like with subtitles inserted in the live contents.

In step S21, the IPTV server 122 obtains the data of the contents. At this time, for example, sound data and image data or the like forming the contents is obtained.

In step S22, the content sample generating section 161 for example encodes the sound data and the image data or the like forming the contents, and generates audio data and video data or the like. Then, on the basis of the audio data and the video data or the like, the content sample generating section 161 generates the data of a "Sample."

In step S23, the fragment multiplexer 162 generates a "Fragment" whose "mdat" includes the data of the "Sample" generated in step S22.

In step S24, the TT server 121 performs a subtitle data inserting process to be described later with reference to FIG. 21. Data relating to subtitles is thereby inserted into the data of the contents to be distributed by streaming.

A detailed example of the subtitle data inserting process in step S24 of FIG. 20 will be described in the following with reference to a flowchart of FIG. 21.

In step S41, TTML text is generated.

In step S42, the TT fragment generating section 141 describes 4CC "ttml" in "sampleEntry" of "stsd" in "moov," and describes "text" in "HandlerType" of "moov.trak.mdia.hdlr." (This process is less frequent than the generation of a "Fragment" to be described later.) In addition, the TT fragment generating section 141 generates the data of a "Fragment" in which a TTML document instance is stored. At this time, the TT fragment generating section 141 provides "ttsd" as a "BOX" in a lower layer than "moof." Then, the TT fragment generating section 141 describes "initFlag: 'true'" or "initFlag: 'false'" as information stored in "ttsd" according to the type of a generated document instance.

For example, when the TTML document instance stored in the "Fragment" in question is an "Initialization Document instance," "initFlag: 'true'" is described as information stored in "ttsd." In addition, for example, when the TTML document instance stored in the "Fragment" in question is a "Body Document instance," "initFlag: 'false'" is described as information stored in "ttsd."

In step S43, the sample inserting section 142 generates the TTML document instance on the basis of the TTML text generated in step S41, and inserts the TTML document instance as a "Sample" of "mdat" in the "Fragment" generated in step S42.

At this time, as described above with reference to FIG. 12, the sample inserting section 142 provides a field "unsigned id(16) document-id;." Then, the sample inserting section 142 describes an identifier for identifying the TTML document instance described in the "Sample" in question in the field "unsigned id(16) document-id;." Incidentally, when the document instance is changed, the above identifier is also changed.

In step S44, the sample inserting section 142 outputs the "Fragment" into which the TTML document instance is inserted by the process of step S43. The "Fragment" in question is thereby supplied to the fragment multiplexer 162 in the IPTV server 122.

Incidentally, a time stamp generated by the NTP-synchronized time stamp generating section 151 is supplied to the TT fragment generating section 141 and the sample inserting section 142 as appropriate.

Figure 20:
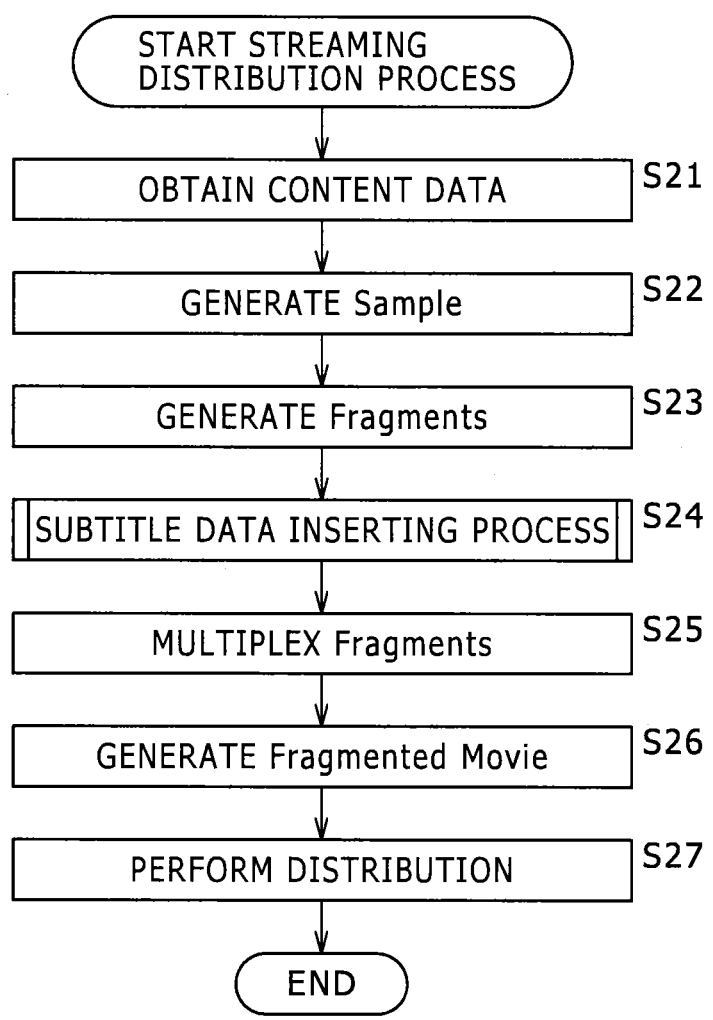
FIG. 20 is a flowchart of assistance in explaining an example of a streaming distribution process.
Figure 21:
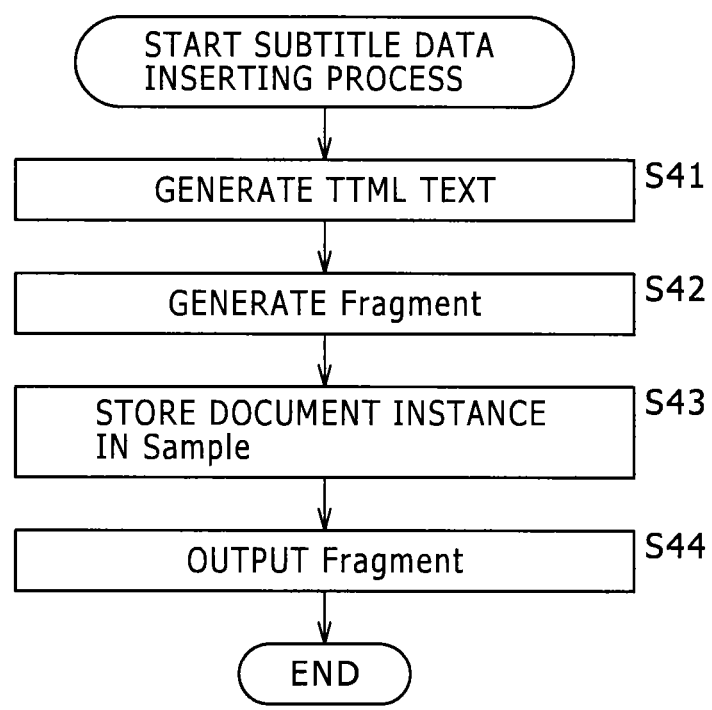
FIG. 21 is a flowchart of assistance in explaining an example of a subtitle data inserting process.

Returning to FIG. 20, after the process of step S24, the fragment multiplexer 162 in step S25 multiplexes the "Fragment" generated in the process of step S42 in FIG. 21 and the "Fragment" generated in the process of step S23. That is, the "Fragment" storing video data, audio data or the like and the "Fragment" storing the TTML document instance are multiplexed.

In step S26, the fragment multiplexer 162 generates the data of a "Fragmented Movie."

In step S27, the fragment distributing section 163 distributes the "Fragmented Movie" generated in the process of step S26 via a network or the like.

The streaming distribution process is thus performed.

An example of a content reproducing process by the IPTV client 123 in FIG. 13 will next be described with reference to a flowchart of FIG. 22.

In step S61, the fragment demultiplexer 182 of the IPTV client 123 receives the "Fragmented Movie" distributed by the process of step S27 in FIG. 20.

In step S62, the fragment demultiplexer 182 analyzes the description of "sampleEntry" of "stsd" in "moov" of the "Fragmented Movie" received in step S61.

In step S63, the fragment demultiplexer 182 extracts each "Fragment" forming the "Fragmented Movie" received in step S61.

In step S64, the fragment demultiplexer 182 determines whether there is a "Fragment" storing a TTML document instance in the "Fragmented Movie" in question on the basis of a result of the analysis in the process of step S62. At this time, when the description of "sampleEntry" of "stsd" in "moov" is "ttml," it is determined that there is a "Fragment" storing a TTML document instance in the "Fragmented Movie" in question.

When it is determined in step S64 that there is a "Fragment" storing a TTML document instance in the "Fragmented Movie" in question, the process proceeds to step S65.

In step S65, the fragment demultiplexer 182 and the TT decoder 183 perform a TT decoding process to be described in the following with reference to a flowchart of FIG. 23.

A detailed example of the TT decoding process in step S65 of FIG. 22 will be described in the following with reference to the flowchart of FIG. 23.

In step S81, the fragment demultiplexer 182 checks "ttsd" in "moof" of each "Fragment."

In step S82, the fragment demultiplexer 182 determines whether the "Fragment" in question stores a TTML document instance. At this time, a "Fragment" having "ttsd" provided in a lower layer than "moof" is determined to be a "Fragment" storing a TTML document instance. On the other hand, a "Fragment" not provided with "ttsd" in "moof" is determined to be a "Fragment" not storing a TTML document instance (a "Fragment" of audio data, video data, or the like).

When it is determined in step S82 that the "Fragment" in question stores a TTML document instance, the process proceeds to step S83.

In step S83, the TT decoder 183 determines the type of the TTML document instance stored in the "Fragment" in question on the basis of the description of "ttsd" in "moof" of the "Fragment." At this time, when the description of "ttsd" is "initFlag: 'true'," it is determined that the "Fragment" in question stores an "Initialization Document instance." On the other hand, when the description of "ttsd" is "initFlag: 'false'," it is determined that the "Fragment" in question stores a "Body Document instance."

When it is determined in the process of step S83 that an "Initialization Document instance" is stored, the process proceeds to step S84.

In step S84, the TT decoder 183 obtains an identifier described in a field "unsigned id(16) document-id;."

In step S85, the TT decoder 183 compares the identifier obtained in step S84 with an identifier stored in advance to determine whether the "Initialization Document instance" is changed. Incidentally, when the "Initialization Document instance" is received for a first time, it is determined that the "Initialization Document instance" is changed.

When it is determined in step S85 that the "Initialization Document instance" is changed, the process proceeds to step S86.

In step S86, the TT decoder 183 stores the identifier described in the field "unsigned id(16) document-id;" of the "Sample" of "mdat" in the "Fragment." Incidentally, when contents are broadcast by streaming on a plurality of channels, for example, the identifier in question is stored in association with a channel.

In step S87, the TT decoder 183 analyzes (decodes) the description of the "Initialization Document instance" stored in the "Sample" of "mdat."

In step S88, the TT decoder 183 sets a rendering context on the basis of a result of the analysis in step S87.

Incidentally, when it is determined in step S85 that the "Initialization Document instance" is not changed, the process of steps S86 to S88 is skipped.

When it is determined in the process of step S83 that a "Body Document instance" is stored, on the other hand, the process proceeds to step S89.

In step S89, the TT decoder 183 analyzes (decodes) the "Body Document instance" stored in the "Sample" of "mdat."

In step S90, the TT decoder 183 generates subtitle display data on the basis of a result of the analysis in step S89. The subtitle display data generated in step S90 is supplied to the display control section 185 together with information relating to display time.

Figure 22:
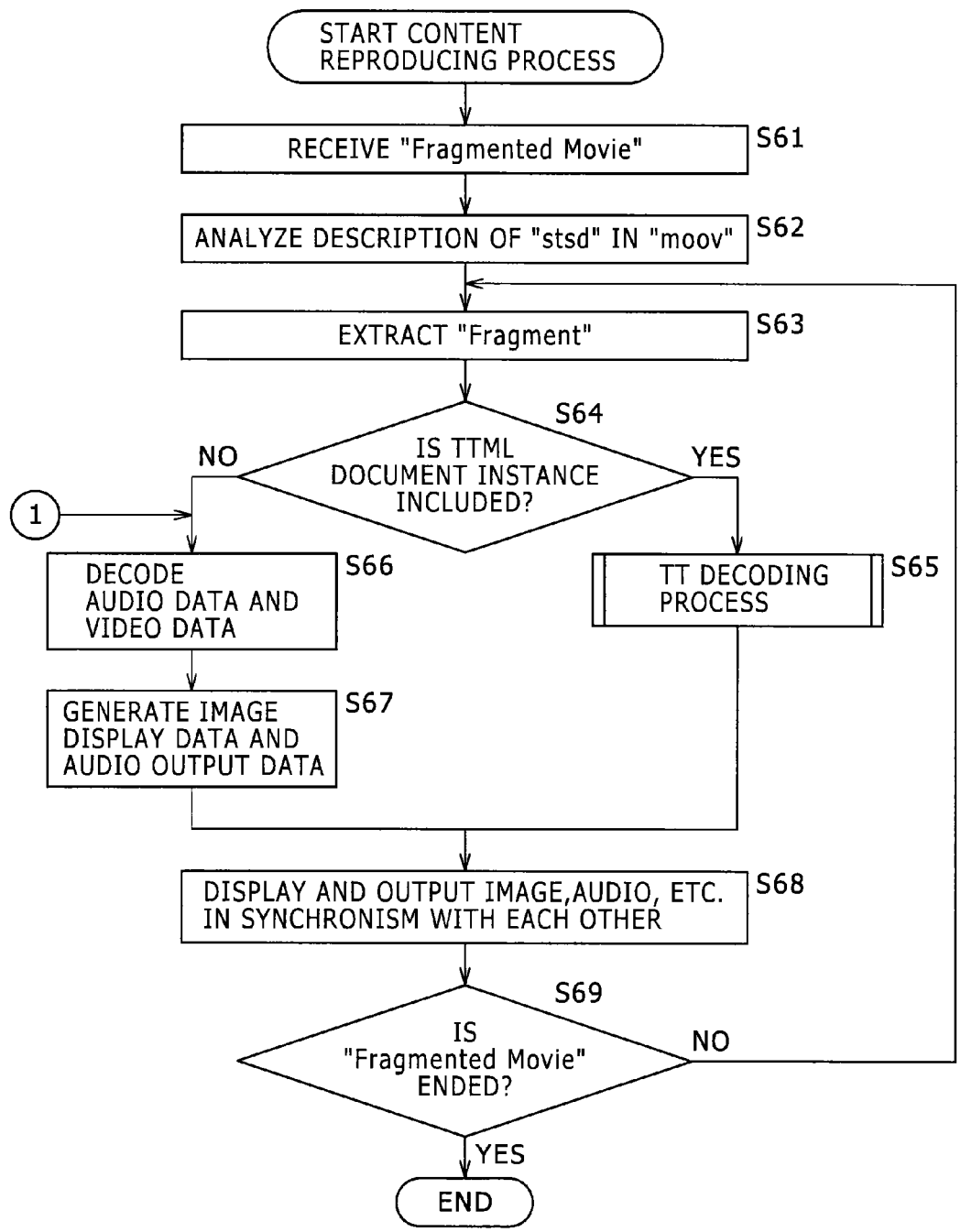
FIG. 22 is a flowchart of assistance in explaining an example of a content reproducing process.

When it is determined in step S82 that the "Fragment" in question does not store a TTML document instance, the process proceeds to step S66 in FIG. 22.

The TT decoding process is thus performed.

Returning to the description of FIG. 22, when it is determined in step S64 that there is no "Fragment" storing a TTML document instance in the "Fragmented Movie" in question, the process proceeds to step S66.

In step S66, the content decoder 184 decodes audio data and video data or the like stored in "Samples" of "mdat."

In step S67, the content decoder 184 outputs image display data and sound output data or the like obtained as a result of the process of step S66. The image display data and the sound output data or the like generated in step S67 are supplied to the display control section 185 together with information relating to display time and output time or the like.

In step S68, the display control section 185 generates an image signal to display subtitles in a state of being superimposed on the image of contents on the basis of the information relating to the display time and the like. The display control section 185 supplies the image signal to a display not shown in the figure or the like. In addition, the display control section 185 generates a sound signal to output the sound of the contents on the basis of the information relating to the output time and the like. The display control section 185 supplies the sound signal to a speaker not shown in the figure or the like.

Figure 23:
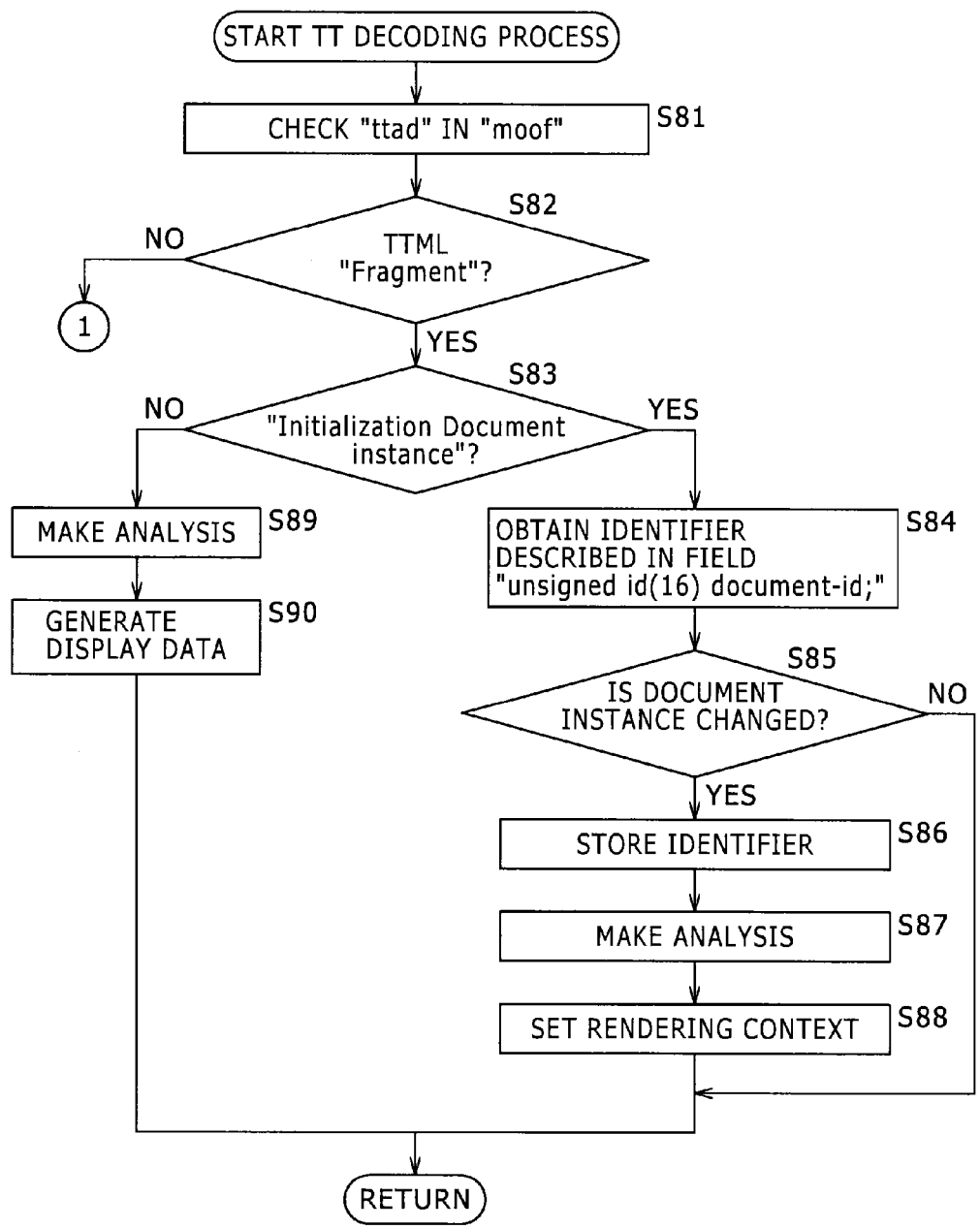
FIG. 23 is a flowchart of assistance in explaining an example of a TT decoding process.

That is, the image display data and the sound output data generated in the process of step S67 in FIG. 22 and the subtitle display data generated in the process of step S90 in FIG. 23 are displayed or output in synchronism with each other.

In step S69, whether the "Fragmented Movie" is ended or not is determined. For example, when "Movie Fragment Random Access (mfra)" shown in FIG. 8 is received, it is determined that the "Fragmented Movie" is ended. In addition, for example, when a user has given a command to stop reception, it is determined that the "Fragmented Movie" is ended.

When it is determined in step S69 that the "Fragmented Movie" is not yet ended, the process returns to step S63.

When it is determined in step S69 that the "Fragmented Movie" is ended, on the other hand, the process is ended.

The content reproducing process is thus performed.

In the above, as described above with reference to FIG. 9, 4CC "ttml" is described in "sampleEntry" of "moov.trak.mdia.minf.stbl.stsd" when information described in TTML is included. However, an "Initialization Document instance" can be further stored in "moov.trak.mdia.minf.stbl.stsd."

FIG. 24 is a diagram of assistance in explaining a configuration of the "BOX" of "moov" storing an "Initialization Document instance." As shown in FIG. 24, as in the case of FIG. 9, 4CC "ttml" is described in "sampleEntry" of "moov.trak.mdia.minf.stbl.stsd," and this 4CC "ttml" is followed by a description "TTconfig { . . . . "

A field "unsigned id(16) document-id;" is provided in the description "TTconfig { . . . " in FIG. 24. As in the case described with reference to FIG. 12, this is a field in which an identifier for identifying a TTML document instance is described. This identifier is for example an ID or a version given to each document instance. As a matter of course, when the document instance is changed, the above identifier is also changed. Thus, a receiver can determine whether the document instance is changed or not.

In addition, a field "unsigned int(16) text-length;" shown in FIG. 24 stores the text length of text stored in a field "unsigned int(8) text[text-length];." The TTML document instance is stored in the field "unsigned int(8) text[text-length];" shown in FIG. 24. In the example of FIG. 24, only an "Initialization Document instance" is stored in the field "unsigned int(8) text[text-length];," and no "Body Document instance" is stored in the field "unsigned int(8) text[text-length];."

Further, in the case where "moov" is configured as shown in FIG. 24, "initFlag: 'true'" or "initFlag: 'false'" does not need to be described (may be described, but is meaningless information) in "ttsd" as a "BOX" in a lower layer than "traf" of "moof." That is, in the present case, TTML document instances stored as "Samples" of "mdat" in each "Fragment" are only "Body Document instances." It is therefore not necessary to indicate whether a TTML document instance stored in a "Fragment" in question is an "Initialization Document instance" or a "Body Document instance."

Further, in the case where "moov" is configured as shown in FIG. 24, when the TT fragment generating section 141 of the IPTV server 122 generates the data of a "Fragmented Movie," for example, the TT fragment generating section 141 describes 4CC "ttml" in "sampleEntry" of "stsd" in "moov," and describes "text" in "HandlerType" of "moov.trak.mdia.hdlr." In addition, the TT fragment generating section 141 adds the description "TTconfig { . . . " in FIG. 24 to "stsd" in "moov." Incidentally, in this case, an "Initialization Document instance" is stored in the field "unsigned int(8) text[text-length];."

In the case where "moov" is configured as shown in FIG. 24, the fragment demultiplexer 182 of the IPTV client 123 analyzes the description of "sampleEntry" of "stsd" in "moov" of the "Fragmented Movie" to determine whether there is a "Fragment" storing a TTML document instance in the "Fragmented Movie" in question. In this case, when it is determined that there is a "Fragment" storing a TTML document instance (that is, when 4CC "ttml" is described in "sampleEntry" of "stsd"), the description "TTconfig { . . . " is supplied to the TT decoder 183.

Then, the TT decoder 183 obtains the identifier described in the field "unsigned id(16) document-id;," and compares the identifier described in the field "unsigned id(16) document-id;" with an identifier stored in advance to determine whether the "Initialization Document instance" is changed. When determining that the "Initialization Document instance" is changed, the TT decoder 183 stores the identifier described in the field "unsigned id(16) document-id;." Incidentally, when contents are broadcast by streaming on a plurality of channels, for example, the identifier in question is stored in association with a channel.

Further, the TT decoder 183 analyzes (decodes) the description of the "Initialization Document instance" stored in the field "unsigned int(8) text[text-length];." Then, a rendering context is set on the basis of a result of the analysis.

Figure 25:
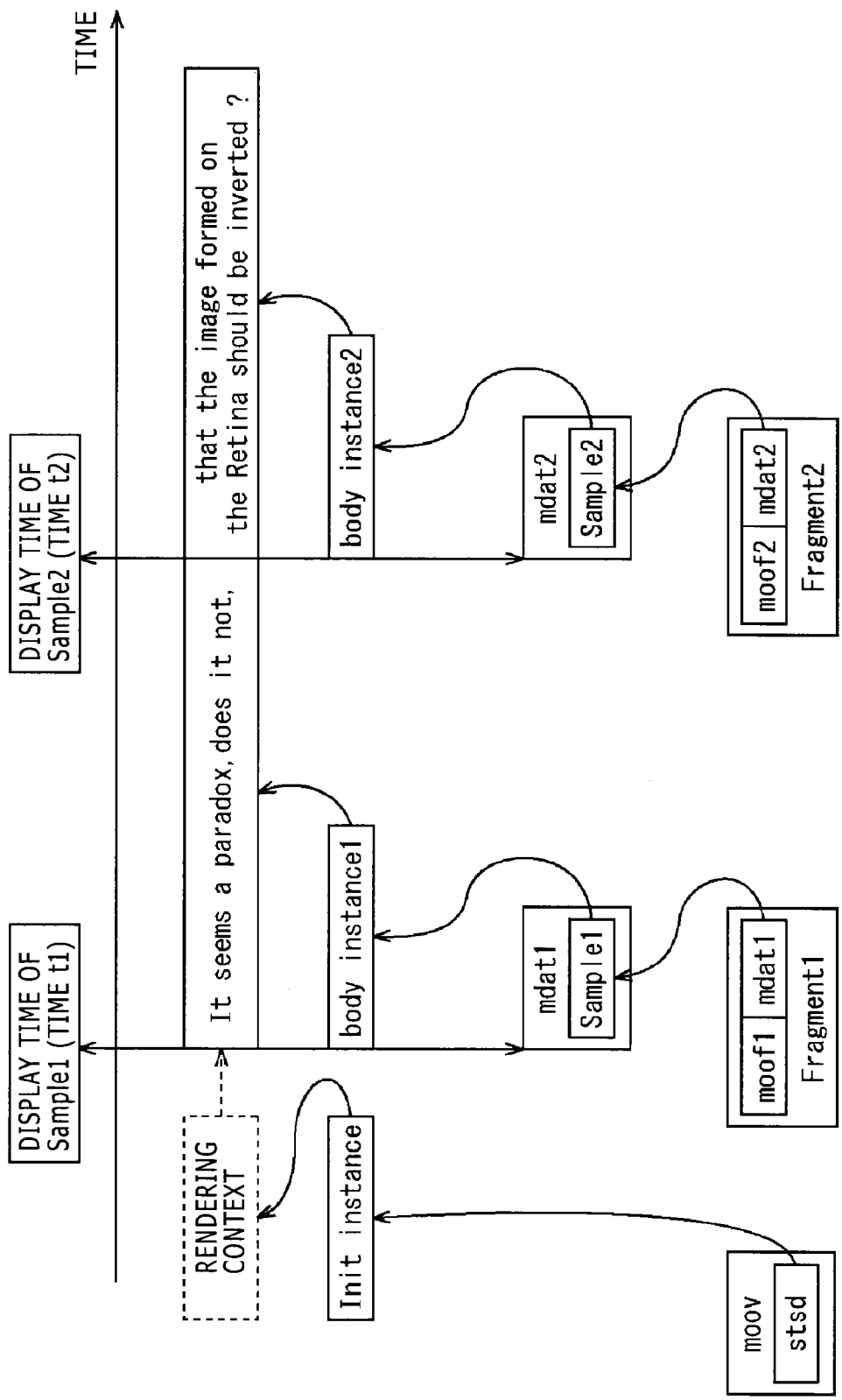
FIG. 25 is a diagram of assistance in explaining an example of display of subtitles corresponding to FIG. 24.

In the case where "moov" is configured as shown in FIG. 24, as shown in FIG. 25, TTML document instances stored as "Samples" of "mdat" in respective "Fragments," that is, Fragment1 and Fragment2 are analyzed, and subtitles are displayed.

In this example, suppose that the "Body Document instance" (Body instance1) shown in FIG. 15 is stored in mdat1 of Fragment1. Further, suppose that the "Body Document instance" (Body instance2) shown in FIG. 17 is stored in mdat2 of Fragment2.

In the example of FIG. 25, a rendering context is set on the basis of the "Initialization Document instance (Init instance)" stored in the "stsd" of "moov." Thereafter, at time t1, a subtitle as shown in FIG. 16 is displayed on the basis of the Body instance1 stored in the Sample1 of mdat1 in Fragment1. Further, thereafter, at time t2, a subtitle as shown in FIG. 18 is displayed on the basis of the Body instance2 stored in the Sample2 of mdat2 in Fragment2.

Incidentally, time t1 and time t2 described above are calculated on the basis of moov.trak.mdia.minf.stbl.stts or the "decoding times" of first "Samples" stored in first mdat corresponding to the moofs which decoding times are described in moof.traf.tfdt.

Thus, an "Initialization Document instance" may be further stored in "moov.trak.mdia.minf.stbl.stsd."

It is to be noted that the series of processes described above can be carried out not only by hardware but also by software. When the series of processes described above is to be carried out by software, a program constituting the software is installed from a network or a recording medium onto a computer incorporated in dedicated hardware or for example a general-purpose personal computer 700 as shown in FIG. 26 which personal computer can perform various functions by installing various programs thereon.

Figure 26:
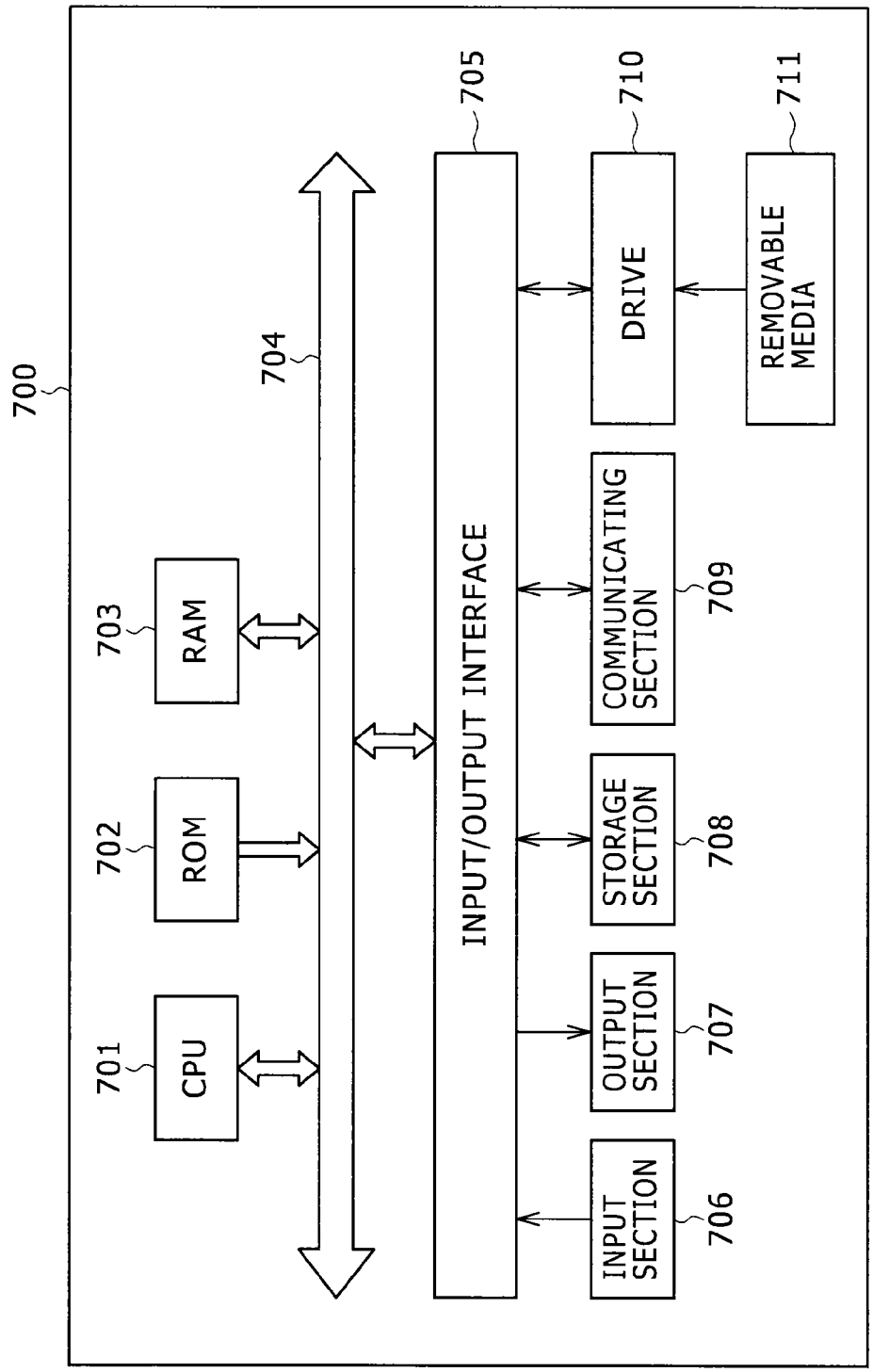
FIG. 26 is a block diagram showing an example of configuration of a personal computer.

In FIG. 26, a CPU (Central Processing Unit) 701 performs various processes according to a program stored in a ROM (Read Only Memory) 702 or a program loaded from a storage section 708 into a RAM (Random Access Memory) 703. The RAM 703 also stores data necessary for the CPU 701 to perform the various processes and the like as appropriate.

The CPU 701, the ROM 702, and the RAM 703 are interconnected via a bus 704. The bus 704 is also connected with an input-output interface 705.

The input-output interface 705 is connected with an input section 706 composed of a keyboard, a mouse and the like, an output section 707 composed of a display formed by an LCD (Liquid Crystal Display) or the like, a speaker, and the like, the storage section 708 composed of a hard disk and the like, and a communicating section 709 composed of a modem and a network interface card such as a LAN card or the like. The communicating section 709 performs a communicating process via a network including the Internet.

The input-output interface 705 is also connected with a drive 710 as required. Removable media 711 such as a magnetic disk, an optical disk, a magneto-optical disk, a semiconductor memory and the like are loaded into the drive 710 as appropriate. A computer program read from these removable media is installed into the storage section 708 as required.

When the series of processes described above is to be carried out by software, a program constituting the software is installed from a network such as the Internet or the like or a recording medium such as the removable media 711 or the like.

Incidentally, the recording medium is not only formed by the removable media 711 shown in FIG. 26, the removable media 711 being distributed to users to distribute the program separately from the device proper and having the program recorded thereon, and the removable media 711 including a magnetic disk (including a floppy disk (registered trademark)), an optical disk (including CD-ROM (Compact Disk-Read Only Memory) and DVD (Digital Versatile Disk)), a magneto-optical disk (including MD (Mini-Disk) (registered trademark)), a semiconductor memory and the like, but also formed by the ROM 702, the hard disk included in the storage section 708, or the like that has the program recorded thereon and which is distributed to the user in a state of being incorporated in the device proper in advance.

It is to be noted that the series of processes described above in the present specification include not only processes performed in time series in the described order but also processes not necessarily performed in time series but performed in parallel or individually.

In addition, embodiments of the present technology are not limited to the foregoing embodiments, but various changes can be made without departing from the spirit of the present technology.

It is to be noted that the present technology can also adopt the following constitutions.

(1) A streaming distributing device including:
a content fragment generating section configured to generate a fragment storing data of a content to be distributed by streaming, the fragment being defined by an MP4 file format; and
a subtitle fragment generating section configured to generate a fragment storing a TTML (Timed Text Markup Language) document instance relating to a subtitle to be displayed in the content, the fragment being defined by the MP4 file format,
wherein the subtitle fragment generating section adds, to header information of the fragment, instance classification distinguishing information for distinguishing whether the TTML document instance stored in the fragment is a TTML document instance specifying a rendering context relating to the subtitle.

(2) The streaming distributing device according to (1), wherein the subtitle fragment generating section stores, in the fragment, a sample in which the TTML document instance is described, together with description content identifying information for individually identifying a description content of the TTML document instance relating to the subtitle.

(3) The streaming distributing device according to (1) or (2), further including a movie header generating section configured to add, in header information of a movie including a plurality of the fragments, fragment classification distinguishing information for indicating that the movie includes the fragment storing the TTML document instance.

(4) The streaming distributing device according to (1) or (2), further including a movie header generating section configured to add, in header information of a movie including a plurality of the fragments, fragment classification distinguishing information for indicating that the movie includes the fragment storing the TTML document instance, wherein the movie header generating section stores the TTML document instance specifying the rendering context relating to the subtitle in the fragment classification distinguishing information, and the instance classification distinguishing information is not added to the header information of the fragment.

(5) A streaming distributing method including:

a content fragment generating section generating a fragment storing data of a content to be distributed by streaming, the fragment being defined by an MP4 file format;

a subtitle fragment generating section configured to generate a fragment storing a TTML (Timed Text Markup Language) document instance relating to a subtitle to be displayed in the content, the fragment being defined by the MP4 file format; and the subtitle fragment generating section configured to add, to header information of the fragment, instance classification distinguishing information for distinguishing whether the TTML document instance stored in the fragment is a TTML document instance specifying a rendering context relating to the subtitle.

(6) A program for making a computer function as a streaming distributing device, the streaming distributing device including:

a content fragment generating section configured to generate a fragment storing data of a content to be distributed by streaming, the fragment being defined by an MP4 file format; and a subtitle fragment generating section configured to generate a fragment storing a TTML (Timed Text Markup Language) document instance relating to a subtitle to be displayed in the content, the fragment being defined by the MP4 file format, wherein the subtitle fragment generating section adds, to header information of the fragment, instance classification distinguishing information for distinguishing whether the TTML document instance stored in the fragment is a TTML document instance specifying a rendering context relating to the subtitle.

(7) A recording medium on which the program of (6) is recorded.

(8) A streaming receiving device including:

a movie receiving section configured to receive data of a movie including a plurality of fragments, the fragments being defined by an MP4 file format;

a TTML determining section configured to determine whether the movie includes a fragment storing a TTML document instance on a basis of fragment classification distinguishing information indicating that the movie includes the fragment storing the TTML document instance, the fragment classification distinguishing information being added to header information of the movie; and a TTML decoding section configured to extract and decode the fragment storing the TTML document instance when the movie is determined to include the fragment storing the TTML document instance.

(9) The streaming receiving device according to (8), wherein the TTML decoding section distinguishes a classification of the TTML document instance stored in the fragment on a basis of instance classification distinguishing information for distinguishing whether the TTML document instance stored in the fragment is a TTML document instance specifying a rendering context relating to a subtitle, the instance classification distinguishing information being included in header information of the fragment, and decodes the TTML document instance.

(10) The streaming receiving device according to (8) or (9), wherein the TTML decoding section distinguishes a classification of the TTML document instance stored in the fragment on a basis of instance classification distinguishing information for distinguishing whether the TTML document instance stored in the fragment is a TTML document instance specifying a rendering context relating to a subtitle, the instance classification distinguishing information being included in header information of the fragment, and the streaming receiving device further includes a decoding determining section configured to determine whether to decode the TTML document instance on a basis of description content identifying information for individually identifying a description content of the TTML document instance relating to the subtitle in a sample stored in the fragment when the TTML document instance stored in the fragment is distinguished as being the TTML document instance specifying the rendering context relating to the subtitle.

(11) The streaming receiving device according to (8) or (9), wherein when the movie is determined to include the fragment storing the TTML document instance, the TTML decoding section decodes a TTML document instance specifying a rendering context relating to a subtitle, the TTML document instance specifying the rendering context relating to the subtitle being included in the fragment classification distinguishing information.

(12) A streaming receiving method including:

a movie receiving section receiving data of a movie including a plurality of fragments, the fragments being defined by an MP4 file format;

a TTML determining section determining whether the movie includes a fragment storing a TTML document instance on a basis of fragment classification distinguishing information indicating that the movie includes the fragment storing the TTML document instance, the fragment classification distinguishing information being added to header information of the movie; and a TTML decoding section extracting and decoding the fragment storing the TTML document instance when the movie is determined to include the fragment storing the TTML document instance.

(13) A program for making a computer function as a streaming receiving device, the streaming receiving device including:

a movie receiving section configured to receive data of a movie including a plurality of fragments, the fragments being defined by an MP4 file format;

a TTML determining section configured to determine whether the movie includes a fragment storing a TTML document instance on a basis of fragment classification distinguishing information indicating that the movie includes the fragment storing the TTML document instance, the fragment classification distinguishing information being added to header information of the movie; and a TTML decoding section configured to extract and decode the fragment storing the TTML document instance when the movie is determined to include the fragment storing the TTML document instance.

(14) A recording medium on which the program of (13) is recorded.

(15) A streaming system including:

a streaming distributing device including a content fragment generating section configured to generate a fragment storing data of a content to be distributed by streaming, the fragment being defined by an MP4 file format, and a subtitle fragment generating section configured to generate a fragment storing a TTML (Timed Text Markup Language) document instance relating to a subtitle to be displayed in the content, the fragment being defined by the MP4 file format;

the subtitle fragment generating section configured to add, to header information of the fragment, instance classification distinguishing information for distinguishing whether the TTML document instance stored in the fragment is a TTML document instance specifying a rendering context relating to the subtitle; and a streaming receiving device including
a movie receiving section configured to receive data of a movie including a plurality of fragments, the fragments being defined by the MP4 file format, a TTML determining section configured to determine whether the movie includes the fragment storing the TTML document instance on a basis of fragment classification distinguishing information indicating that the movie includes the fragment storing the TTML document instance, the fragment classification distinguishing information being added to header information of the movie, and a TTML decoding section configured to extract and decode the fragment storing the TTML document instance when the movie is determined to include the fragment storing the TTML document instance.

What is claimed is:

1. A streaming distributing device for distributing streaming live contents comprising:
    circuitry to:
    generate a first fragment storing data of a content to be distributed by streaming;
    generate a second fragment storing a timed text markup language document instance relating to a subtitle to be displayed in said content;
    add, to header information of said second fragment, instance classification distinguishing information for distinguishing whether said timed text markup language document instance stored in said second fragment is a timed text markup language document instance specifying a rendering context relating to said subtitle; and
    store, in said second fragment, a sample in which said timed text markup language document instance is described, together with description content identifying information for individually identifying a description content of said timed text markup language document instance relating to said subtitle for distinguishing whether said timed text markup language document instance is an initialization document instance or a body document instance using flag information indicating true or false,
    wherein, only when said timed text markup language document instance is an initialization document instance, the sample includes an identifier indicating whether the initialization document instance is changed after the initialization document instance was generated.

2. The streaming distributing device according to claim 1, wherein
    said circuitry adds, in header information of a movie including a plurality of said second fragments, fragment classification distinguishing information for indicating that said movie includes the second fragment storing said timed text markup language document instance.

3. The streaming distributing device according to claim 1, wherein
    said circuitry adds, in header information of a movie including a plurality of said second fragments, fragment classification distinguishing information for indicating that said movie includes the second fragment storing said timed text markup language document instance,
    said circuitry stores said timed text markup language document instance specifying the rendering context relating to said subtitle in the fragment classification distinguishing information, and
    said instance classification distinguishing information is not added to the header information of said second fragment.

4. The streaming distributing device according to claim 1, wherein
    the identifier is an ID or version information.

5. A streaming distributing method for distributing streaming live contents comprising:
    generating, using circuitry, a first fragment storing data of a content to be distributed by streaming;
    generating, using said circuitry, a second fragment storing a timed text markup language document instance relating to a subtitle to be displayed in said content;
    adding, using said circuitry, to header information of said second fragment, instance classification distinguishing information for distinguishing whether said timed text markup language document instance stored in said second fragment is a timed text markup language document instance specifying a rendering context relating to said subtitle; and
    storing, using said circuitry, in said second fragment, a sample in which said timed text markup language document instance is described, together with description content identifying information for individually identifying a description content of said timed text markup language document instance relating to said subtitle for distinguishing whether said timed text markup language document instance is an initialization document instance or a body document instance using flag information indicating true or false,
    wherein, only when said timed text markup language document instance is an initialization document instance, the sample includes an identifier indicating whether the initialization document instance is changed after the initialization document instance was generated.

6. A non-transitory computer readable storage medium including executable instructions, which when executed by a computer cause the computer to execute a method for use in a streaming distributing device for distributing streaming live contents, the method comprising:
    generating a first fragment storing data of a content to be distributed by streaming;
    generating a second fragment storing a timed text markup language document instance relating to a subtitle to be displayed in said content;
    adding, to header information of said second fragment, instance classification distinguishing information for distinguishing whether said timed text markup language document instance stored in said second fragment is a timed text markup language document instance specifying a rendering context relating to said subtitle; and
    storing, in said second fragment, a sample in which said timed text markup language document instance is described, together with description content identifying information for individually identifying a description content of said timed text markup language document instance relating to said subtitle for distinguishing whether said timed text markup language document instance is an initialization document instance or a body document instance using flag information indicating true or false, wherein, only when said timed text markup language document instance is an initialization document instance, the sample includes an identifier indicating whether the initialization document instance is changed after the initialization document instance was generated.

7. A streaming receiving device for receiving streaming live contents comprising:

circuitry to:

receive data of a movie including a plurality of fragments;

determine whether said movie includes a fragment storing a timed text markup language document instance on a basis of fragment classification distinguishing information indicating that said movie includes the fragment storing said timed text markup language document instance, the fragment classification distinguishing information being added to header information of said movie;

extract and decode the fragment storing said timed text markup language document instance when said movie is determined to include the fragment storing said timed text markup language document instance;

distinguish a classification of said timed text markup language document instance stored in said fragment on a basis of instance classification distinguishing information for distinguishing whether said timed text markup language document instance stored in said fragment is a timed text markup language document instance specifying a rendering context relating to a subtitle, the instance classification distinguishing information being included in header information of said fragment; and determine whether to decode said timed text markup language document instance on a basis of description content identifying information for individually identifying a description content of said timed text markup language document instance relating to said subtitle for distinguishing whether said timed text markup language document instance is an initialization document instance or a body document instance in a sample stored in said fragment using flag information indicating true or false when said timed text markup language document instance stored in said fragment is distinguished as being said timed text markup language document instance specifying the rendering context relating to said subtitle, wherein the sample includes an identifier indicating whether the initialization document instance is changed, and said circuitry analyzes a description of the initialization document instance only when said circuitry determines that said timed text markup language document instance is the initialization document instance and that the identifier indicates the initialization document instance is changed after the initialization document instance was generated.

8. The streaming receiving device according to claim 7, wherein when said movie is determined to include the fragment storing said timed text markup language document instance, said circuitry decodes a timed text markup language document instance specifying a rendering context relating to a subtitle, said timed text markup language document instance specifying the rendering context relating to the subtitle being included in the fragment classification distinguishing information.

9. The streaming receiving device according to claim 7, wherein the identifier is an ID or version information.

10. A streaming receiving method for receiving streaming live contents comprising:

receiving, using circuitry, data of a movie including a plurality of fragments;

determining, using said circuitry, whether said movie includes a fragment storing a timed text markup language document instance on a basis of fragment classification distinguishing information indicating that said movie includes the fragment storing said timed text markup language document instance, the fragment classification distinguishing information being added to header information of said movie;

extracting and decoding, using said circuitry, the fragment storing said timed text markup language document instance when said movie is determined to include the fragment storing said timed text markup language document instance;

distinguishing, using said circuitry, a classification of said timed text markup language document instance stored in said fragment on a basis of instance classification distinguishing information for distinguishing whether said timed text markup language document instance stored in said fragment is a timed text markup language document instance specifying a rendering context relating to a subtitle, the instance classification distinguishing information being included in header information of said fragment;

determining, using said circuitry, whether to decode said timed text markup language document instance on a basis of description content identifying information for individually identifying a description content of said timed text markup language document instance relating to said subtitle for distinguishing whether said timed text markup language document instance is an initialization document instance or a body document instance in a sample stored in said fragment using flag information indicating true or false when said timed text markup language document instance stored in said fragment is distinguished as being said timed text markup language document instance specifying the rendering context relating to said subtitle, the sample including an identifier indicating whether the initialization document instance is changed; and analyzing, using said circuitry, a description of the initialization document instance only when said circuitry determines that said timed text markup language document instance is the initialization document instance and that the identifier indicates the initialization document instance is changed after the initialization document instance was generated.

11. A non-transitory computer readable storage medium including executable instructions, which when executed by a computer cause the computer to execute a method for use in a streaming receiving device for receiving streaming live contents, the method comprising:

receiving data of a movie including a plurality of fragments;

determining whether said movie includes a fragment storing a timed text markup language document instance on a basis of fragment classification distinguishing information indicating that said movie includes the fragment storing said timed text markup language document instance, the fragment classification distinguishing information being added to header information of said movie;

extracting and decoding the fragment storing said timed text markup language document instance when said movie is determined to include the fragment storing said timed text markup language document instance;

distinguishing a classification of said timed text markup language document instance stored in said fragment on a basis of instance classification distinguishing information for distinguishing whether said timed text markup language document instance stored in said fragment is a timed text markup language document instance specifying a rendering context relating to a subtitle, the instance classification distinguishing information being included in header information of said fragment;

determining whether to decode said timed text markup language document instance on a basis of description content identifying information for individually identifying a description content of said timed text markup language document instance relating to said subtitle for distinguishing whether said timed text markup language document instance is an initialization document instance or a body document instance in a sample stored in said fragment using flag information indicating true or false when said timed text markup language document instance stored in said fragment is distinguished as being said timed text markup language document instance specifying the rendering context relating to said subtitle, the sample including an identifier indicating whether the initialization document instance is changed; and analyzing a description of the initialization document instance only when the computer determines that said timed text markup language document instance is the initialization document instance and that the identifier indicates the initialization document instance is changed after the initialization document instance was generated.

12. A streaming system for distributing and receiving streaming live contents comprising:

a streaming distributing device including:
first circuitry to:
generate a first fragment storing data of a content to be distributed by streaming;
generate a second fragment storing a timed text markup language document instance relating to a subtitle to be displayed in said content;
add, to header information of said second fragment, instance classification distinguishing information for distinguishing whether said timed text markup language document instance stored in said second fragment is a timed text markup language document instance specifying a rendering context relating to said subtitle; and
store, in said second fragment, a sample in which said timed text markup language document instance is described, together with description content identifying information for individually identifying a description content of said timed text markup language document instance relating to said subtitle for distinguishing whether said timed text markup language document instance is an initialization document instance or a body document instance using flag information indicating true or false,
wherein, only when said timed text markup language document instance is an initialization document instance, the sample includes an identifier indicating whether the initialization document instance is changed after the initialization document instance was generated; and a streaming receiving device including:
second circuitry to:
receive data of a movie including a plurality of said second fragments;
determine whether said movie includes said second fragment storing said timed text markup language document instance on a basis of fragment classification distinguishing information indicating that said movie includes the second fragment storing said timed text markup language document instance, the fragment classification distinguishing information being added to header information of said movie;
extract and decode the second fragment storing said timed text markup language document instance when said movie is determined to include the second fragment storing said timed text markup language document instance;
distinguish a classification of said timed text markup language document instance stored in said second fragment on a basis of the instance classification distinguishing information for distinguishing whether said timed text markup language document instance stored in said second fragment is a timed text markup language document instance specifying a rendering context relating to a subtitle, the instance classification distinguishing information being included in header information of said second fragment; and
determine whether to decode said timed text markup language document instance on a basis of the description content identifying information for individually identifying a description content of said timed text markup language document instance relating to said subtitle for distinguishing whether said timed text markup language document instance is an initialization document instance or a body document instance in a sample stored in said second fragment using flag information indicating true or false when said timed text markup language document instance stored in said second fragment is distinguished as being said timed text markup language document instance specifying the rendering context relating to said subtitle,
wherein the sample includes the identifier indicating whether the initialization document instance is changed after the initialization document instance was generated, and said second circuitry analyzes a description of the initialization document instance only when said second circuitry determines that said timed text markup language document instance is the initialization document instance and that the identifier indicates the initialization document instance is changed after the initialization document instance was generated.

13. The streaming system according to claim 12, wherein the identifier is an ID or version information.

* * * * *